(12) United States Patent
Gandhi et al.

(10) Patent No.: US 10,321,397 B2
(45) Date of Patent: Jun. 11, 2019

(54) SYSTEM AND METHOD TO FACILITATE POWER MANAGEMENT IN A LONG RANGE RADIO NETWORK ENVIRONMENT

(71) Applicant: CISCO TECHNOLOGY, INC., San Jose, CA (US)

(72) Inventors: Indermeet Singh Gandhi, Bangalore (IN); Srinath Gundavelli, San Jose, CA (US); Ramachandra Srinivasa Murthy, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 108 days.

(21) Appl. No.: 15/347,606

(22) Filed: Nov. 9, 2016

(65) Prior Publication Data

US 2018/0132177 A1    May 10, 2018

(51) Int. Cl.
*H04W 52/02* (2009.01)
*H04W 4/80* (2018.01)
*H04W 84/04* (2009.01)

(52) U.S. Cl.
CPC ......... *H04W 52/0216* (2013.01); *H04W 4/80* (2018.02); *H04W 52/0235* (2013.01); *H04W 84/042* (2013.01); *Y02D 70/00* (2018.01); *Y02D 70/1224* (2018.01); *Y02D 70/1262* (2018.01); *Y02D 70/142* (2018.01); *Y02D 70/146* (2018.01); *Y02D 70/26* (2018.01)

(58) Field of Classification Search
CPC .......................... H04W 52/0216; H04W 4/008; H04W 84/042
See application file for complete search history.

(56) References Cited

U.S. PATENT DOCUMENTS

| 8,494,594 | B2 | 7/2013 | Ryu et al. | |
|---|---|---|---|---|
| 8,730,859 | B2 | 5/2014 | Park et al. | |
| 9,301,251 | B2 | 3/2016 | Eriksson et al. | |
| 9,752,840 | B1* | 9/2017 | Betro | H04W 4/029 |
| 2006/0281436 | A1* | 12/2006 | Kim | H04W 36/24 455/343.2 |
| 2009/0046641 | A1* | 2/2009 | Wang | H04W 74/002 370/329 |

(Continued)

OTHER PUBLICATIONS

Postcapes, "Guide to LoRa Network Protocol and Long Range Wireless IoT," Published Oct. 2016; 10 pages http://www.postscapes.com/long-range-wireless-iot-protocol-lora/.

(Continued)

*Primary Examiner* — Christine Ng
(74) *Attorney, Agent, or Firm* — Patterson + Sheridan, LLP

(57) ABSTRACT

An example method is provided in one example embodiment and may include receiving a power saving mode (PSM) request by a long range radio, wherein the PSM request comprises an identification of at least one receive window to disable for the long range radio for a plurality of uplink transmissions and an identification of a duration for which the at least one receive window is to be disabled for the plurality of uplink transmissions; and transmitting the plurality of uplink transmissions by the long range radio, wherein the at least one receive window is disabled following each uplink transmission of the plurality of uplink transmissions by the long range radio for the duration identified in the PSM request.

20 Claims, 9 Drawing Sheets

(56) References Cited

U.S. PATENT DOCUMENTS

| | | | |
|---|---|---|---|
| 2010/0323647 A1* | 12/2010 | Ryu | H04W 52/0251 455/127.5 |
| 2014/0153512 A1 | 6/2014 | Koskela et al. | |
| 2015/0117285 A1 | 4/2015 | Xie et al. | |
| 2016/0219561 A1 | 7/2016 | Bergqvist et al. | |
| 2017/0171908 A1* | 6/2017 | Agarwal | H04W 76/048 |

OTHER PUBLICATIONS

Semtech, "Lora Advantage," Feb. 2014; 69 pages.

LoRa Alliance, "LoRa Technology," Published on or about Jan. 16, 2016; 3 pages https://www.lora-alliance.org/What-Is-LoRa/Technology.

RF Wireless World, "What is LoRa wireless?" Printed from the internet on Aug. 19, 2016; 5 pages http://www.rfwireless-world.com/Terminology/LoRa-technology-basics.html.

"Managing the downlink RX windows, Issue #14—brocaar/loraserver," blog discussion posted by gzwsc2007 on GitHub, Apr. 27, 2016; 9 pages http://github.com/brocaar/loraserver/issues/14.

LoRa Alliance, Inc., "Mobile Experts White Paper for LoRa Alliance: Where does LoRa Fit in the Big Picture?" White Paper, Apr. 2016; 9 pages.

Sornin, N., et al., "LoRaWAN Specification: Notice of Use and Disclosure," LoRa Alliance, Inc., Jan. 2015; 82 pages.

LoRa Alliance, Inc., "LoRaWAN—What is it? A technical overview of LoRa and LoRaWAN," Technical Marketing Workgroup 1.0, Nov. 2015; 20 pages.

Microchip Technology, Inc., "RN2483 LoRa™ Technology Module Command Reference User's Guide," Jan. 27, 2015; 50 pages.

"ALOHAnet," from Wikipedia, the free encyclopedia, Aug. 20, 2016; 10 pages.

"Discontinuous reception," from Wikipedia, the free encyclopedia, Oct. 3, 2015; 2 pages.

Notification of Transmittal of The International Search Report and the Written Opinion of the International Searching Authority, or The Declaration for Application No. PCT/US2017060605 dated Jan. 29, 2018.

Somin et al, "LoRaWan Specification," Version V1.0, Date Jan. 2015, 82 pages.

* cited by examiner

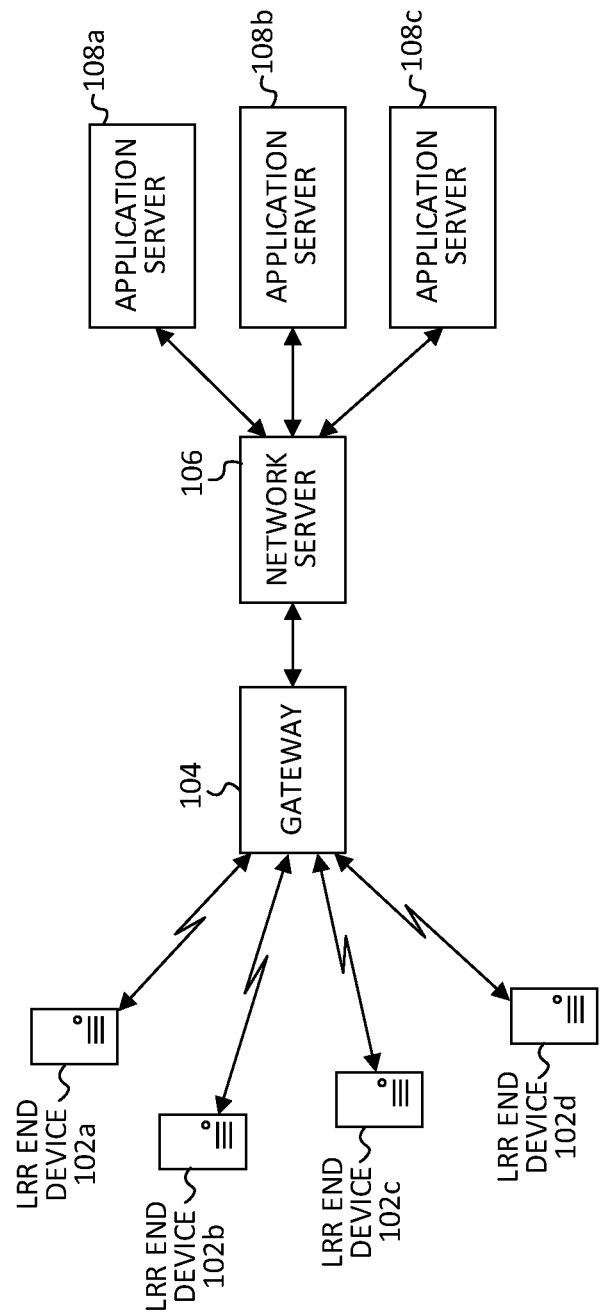

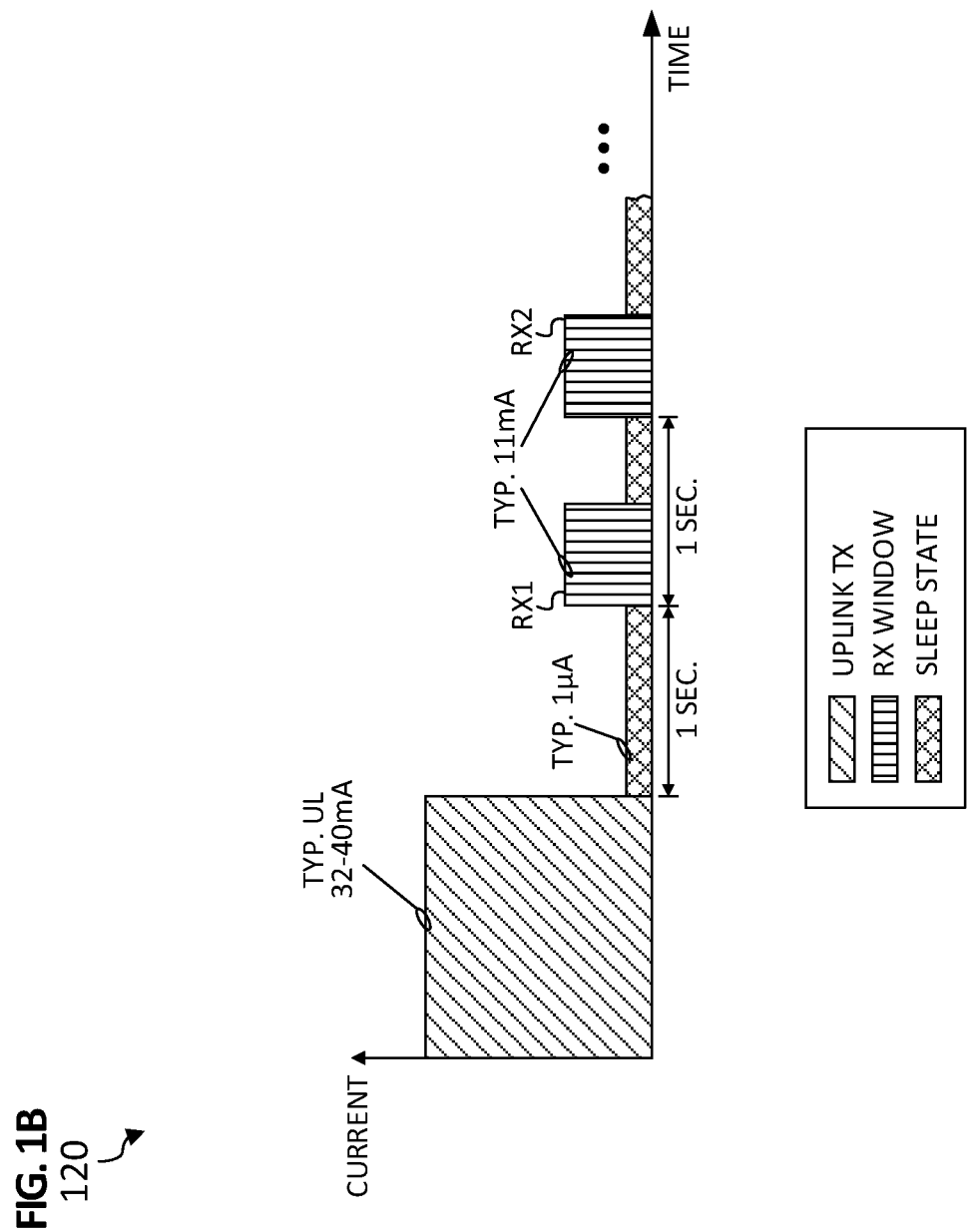

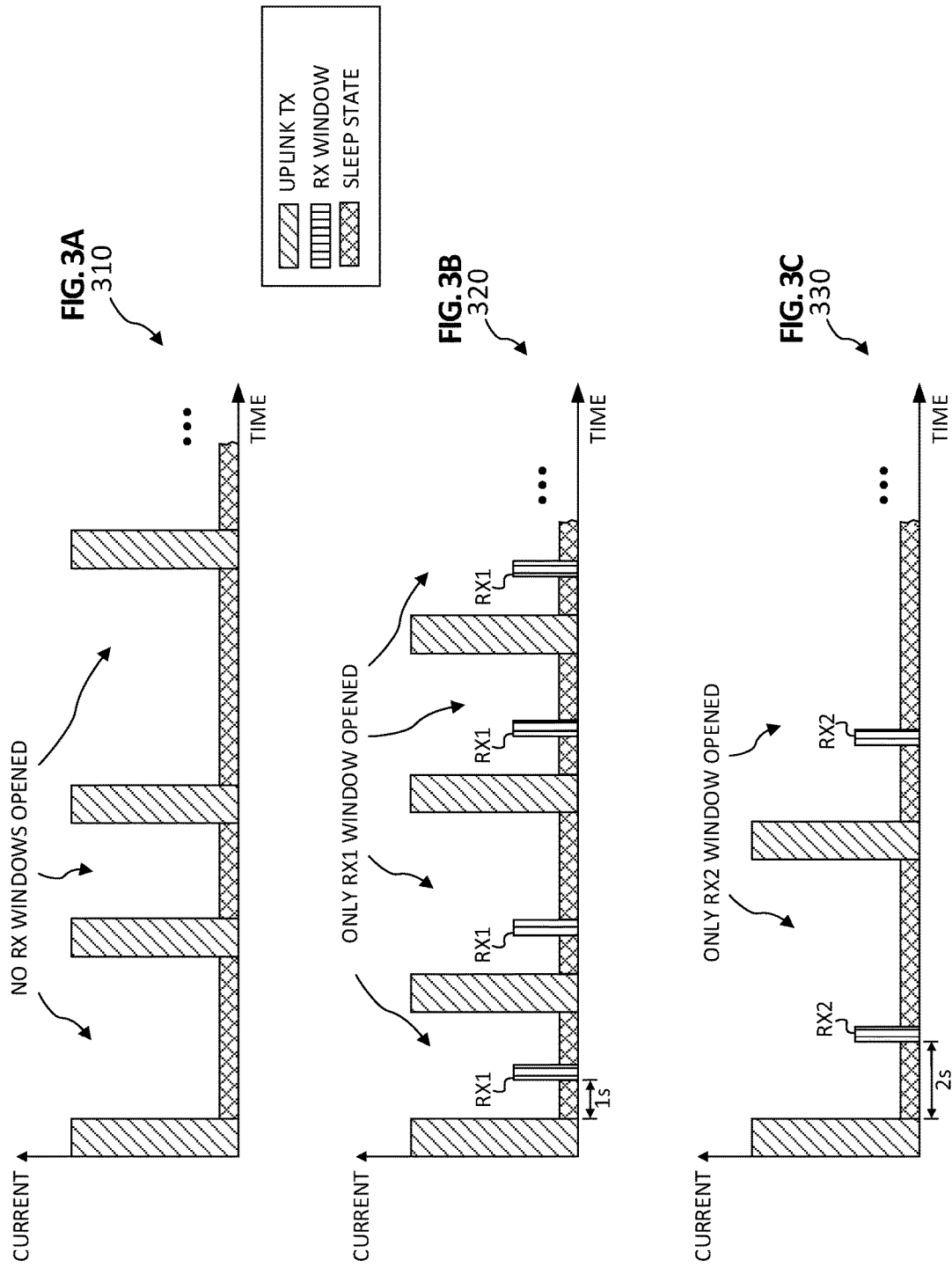

600

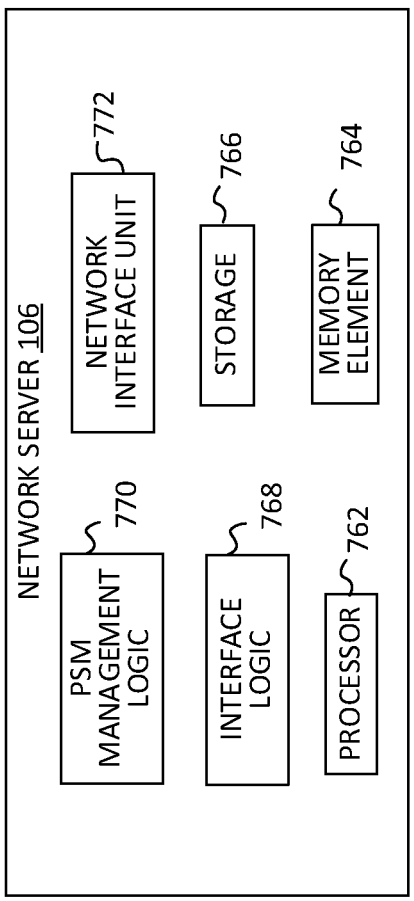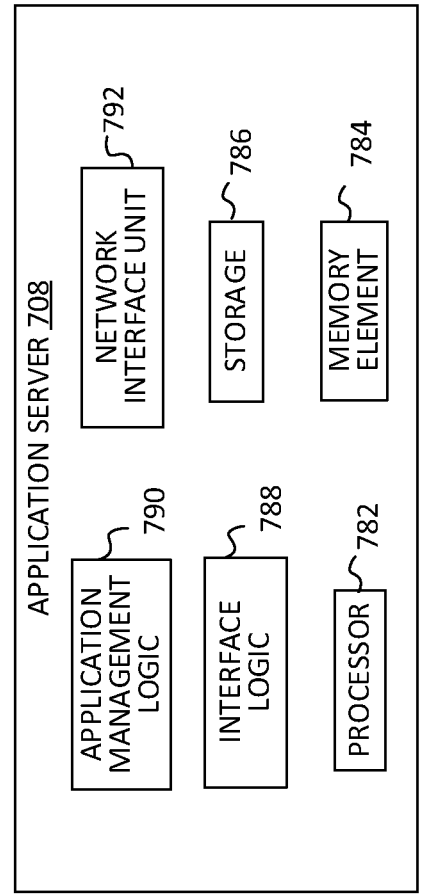

US 10,321,397 B2

SYSTEM AND METHOD TO FACILITATE POWER MANAGEMENT IN A LONG RANGE RADIO NETWORK ENVIRONMENT

TECHNICAL FIELD

This disclosure relates in general to the field of communications and, more particularly, to a system and method to facilitate power management in a long range radio network environment.

BACKGROUND

Networking architectures have grown increasingly complex in communication environments. The LoRa™ Alliance has developed protocols and system architectures such as LoRa™ Wide Area Network (LoRaWAN™) that seek to standardize the operation of Low Power Wide Area Networks (LPWANs) to facilitate the operation of long range radios (LRRs), that are typically battery operated, in a network environment. For battery operated long range radios, power management is critical to maximize the battery life of such devices. LoRaWAN™ Protocol Specification V1.0 (2015) provides standards that facilitate communications among network devices in LPWANs; however, the Protocol Specification does not address power management for long range radios. Accordingly, there are significant challenges in providing power management for long range radios operating in a long range network environment.

BRIEF DESCRIPTION OF THE DRAWINGS

To provide a more complete understanding of the present disclosure and features and advantages thereof, reference is made to the following detailed description, taken in conjunction with the accompanying figures, wherein like reference numerals represent like parts, in which:

FIG. 1A is simplified block diagrams illustrating a communication system to facilitate power management in a long range radio (LRR) network environment according to one embodiment of the present disclosure;

FIG. 1B is a simplified block diagram illustrating an example power profile for a typical LoRa™ end device;

FIGS. 3A-3C are a simplified schematic diagrams illustrating example details that can be associated example power profiles that can be realized for long range radio end devices for various potential embodiments of the communication system;

FIGS. 7A-7D are simplified block diagrams illustrating example details that can be associated various potential embodiments of the communication system.

DETAILED DESCRIPTION OF EXAMPLE EMBODIMENTS

Overview

Figure 2A:
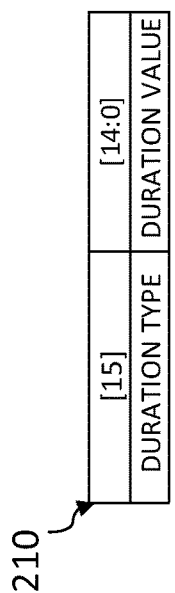
FIGS. 2A-2D are simplified schematic diagrams illustrating example details that can be associated with various Medium Access Control (MAC) command payloads that can be sent from a network server in accordance with various potential embodiments of the communication system.

A method is provided in one example embodiment and may include receiving a power saving mode (PSM) request by a long range radio, wherein the PSM request comprises an identification of at least one receive window to disable for the long range radio for a plurality of uplink transmissions and an identification of a duration for which the at least one receive window is to be disabled for the plurality of uplink transmissions; and transmitting the plurality of uplink transmissions by the long range radio, wherein the at least one receive window is disabled following each uplink transmission of the plurality of uplink transmissions by the long range radio for the duration identified in the PSM request. The PSM request can be received from a network server in communication with the long range radio.

In various instances, the duration can identify one of: a period of time for which the long range radio is to disable the at least one receive window following each uplink transmission of the plurality of uplink transmissions; and a number of uplink transmissions for which the long range radio is to disable the at least one receive window following each uplink transmission of the plurality of uplink transmissions. The method can further include transitioning the long range radio to a sleep state following each uplink transmission of the plurality of transmissions for which at least one receive window is disabled. In some instances, the long range radio can be configured as a Class A LoRa™ end device configured to operate within a LoRaWAN™ deployment. In some instances, the PSM request can be a Medium Access Control (MAC) command configured to be received by a Class A LoRa™ end device.

In some cases, the method can further include determining by the long range radio whether to comply with the PSM request based, at least in part, on whether one or more PSM parameters stored by the long range radio identifies at least one of: another at least one receive window to disable that is different than the at least one receive window identified in the PSM request; and another duration that is different than the duration identified in the PSM request. The method can further include sending a PSM response to the network server following the determining, wherein the PSM response does not include a payload based on the long range radio determining that it will comply with the PSM request and wherein the PSM response does include a payload based on the long range radio determining that it will not comply with the PSM request. In various instances, the payload of the PSM response can include at least one of: an identification of the another at least one receive window that the long range radio will disable that is different than the at least one receive window identified in the PSM request; and an identification of the another duration that is different that is different than the duration identified in the PSM request.

Example Embodiments

Referring to FIG. 1A, FIG. 1A is simplified block diagrams illustrating a communication system 100 to facilitate power management in a LRR network environment according to one embodiment of the present disclosure. In at least one embodiment, communication system 100 can be associated with a LoRa™ architecture operating according to LoRaWAN™ Protocol Specifications as defined by the LoRa™ Alliance. In some embodiments, communication system 100 can be associated with other communication architectures such as, for example, a 3rd Generation Partnership Project (3GPP) architecture such as a Long Term Evolution (LTE) architecture, sometimes referred to as 4th Generation (4G), other 3GPP architectures (e.g., 2nd Generation (2G), 3rd Generation (3G), 5th Generation (5G), etc.) and/or non-3GPP architectures (e.g., Institute of Electrical and Electronic Engineers (IEEE) 802.11 Wi-Fi, Worldwide Interoperability for Microwave Access (WiMAX), etc.)

Communication system 100 can include one or more LRR end devices 102a-102d, a gateway 104, a network server 106 and one or more application servers 108a-108c. Each respective LRR end device 102a-102d can interface with gateway 104 respective over-the-air (OTA) Radio Frequency (RF) communications. Gateway 104 can interface with network server 106 using one or more wired and/or wireless interfaces. Network server 106 can also interface with one or more application server(s) 108a-108c using one or more wired and/or wireless interfaces.

Each of the elements of FIG. 1A may couple to one another through simple interfaces or through any other suitable connection (wired or wireless), which provides a viable pathway for network communications. Additionally, any one or more of these elements may be combined or removed from the architecture based on particular configuration needs. Communications in a network environment are referred to herein as 'messages', 'messaging' and/or 'signaling', which may be inclusive of packets. Generally, signaling is referred to in reference to control-plane packets while messaging can be referred to in reference to control-plane or data-plane packets exchanged for communications at the application level.

A packet is a formatted unit of data and can contain both control information (e.g., source and destination address, etc.) and data, which is also known as payload. In some embodiments, control information can be included in headers and trailers for packets. Messages can be sent and received according to any suitable communication messaging protocols. Suitable communication messaging protocols can include a multi-layered scheme such as the Open Systems Interconnection (OSI) Model, or any derivations or variants thereof. The terms 'data', 'information' and 'parameters' as used herein can refer to any type of binary, numeric, voice, video, textual or script data or information or any type of source or object code, or any other suitable data or information in any appropriate format that can be communicated from one point to another in electronic devices and/or networks. Additionally, messages, requests, responses, replies, queries, etc. are forms of network traffic and, therefore, may comprise one or more packets.

In various embodiments, communication system 100 can represent a series of points or nodes of interconnected communication paths (wired or wireless) for receiving and transmitting packets of information that propagate through communication system 100. In various embodiments, communication system 100 can be associated with and/or provided by a single network operator or service provider and/or multiple network operators or service providers. In various embodiments, communication system 100 can include and/or overlap with, in whole or in part, one or more packet data network (PDN). Communication system 100 may offer communicative interfaces between various elements of communication system 100 and may be any local area network (LAN), wireless local area network (WLAN), metropolitan area network (MAN), wide area network (WAN), virtual private network (VPN), Radio Access Network (RAN), virtual local area network (VLAN), enterprise network, Intranet, extranet, or any other appropriate architecture or system that facilitates communications in a network environment.

In various embodiments, communication system 100 may implement user datagram protocol/Internet Protocol (UDP/IP) connections and/or transmission control protocol/IP (TCP/IP) communication language protocol in particular embodiments of the present disclosure. However, communication system 100 can alternatively implement any other suitable communication protocol, interface and/or standard, proprietary and/or non-proprietary, for transmitting and receiving messaging and/or signaling. Other protocols, interfaces and/or communication standards that can be used in communication system 100 can include 3GPP Diameter-based protocols, Remote Authentication Dial-In User Service (RADIUS) protocols, Authentication, Authorization and Accounting (AAA) signaling, a Terminal Access controller access-control system (TACACS), TACACS+, Proxy Mobile IP version 6 (PMIPv6), Proxy Mobile IP version 4 (PMIPv4), Extensible Messaging and Presence Protocol (XMPP), General Packet Radio Service (GPRS) Tunneling Protocol (GTP) (version 1 or version 2), Generic Route Encapsulation (GRE), Ethernet over GRE (EoGRE), etc. In various embodiments, AAA signaling can include signaling exchanges facilitated via Diameter, RADIUS, Extensible Messaging and Presence Protocol (XMPP), Simple Object Access Protocol (SOAP), SOAP over Hypertext Transfer Protocol (HTTP), Representational State Transfer (REST), combinations thereof or the like. In some embodiments, secure communications can be facilitate using TCP/IP Secure Sockets Layer (SSL) communications.

In general, network server 105 can interface with one or more application server(s) 108a-108c and gateway 104 to facilitate management of communications received from each LRR end device 102a-102d and/or communications sent to each LRR end device 102a-102d. Consider an operational example in which an application server say, for example, application server 108a desires to configure a sensor based application to run on LRR end device 102c. Application server 108a can interface with network server 106, which can interface with gateway 104 to configure the application to run on LRR end device 102c using one or more downlink communications. For sensor data generated by LRR end device 102c using one or more uplink communications, the network server 106, via gateway 104, can facilitate sending the data to application server 108a. In some embodiments, network server 106 can generate one or more acknowledgments (ACKs) to send to an LRR end device upon successful receipt of data from the device. However, ACKs are not required for operation of an LPWAN.

In various embodiments, the network server 106 can be implemented as any hardware or software server or combination of servers, which may be running in a distributed or centralized manner in one or more datacenter environments, cloud environments, enterprise network environments, combinations thereof or the like. In addition to managing communications between LRR end devices and application servers, network server 106 can also perform various operations including, but not limited to: performing packet filtering, managing network and/or device-level security and/or managing data flows (e.g., managing Quality of Service (QoS) levels, bit rates, and/or bandwidth based on one or more policies, contracts, service level agreements, etc.) in the communication system. In addition, as discussed for various embodiments described herein, network server 106 can facilitate configuring a Power Saving Mode (PSM) for one or more of LRR end devices 102a-102d. In various embodiments, a contract or service level agreement can include configuration data related to an end device and/or one or more application(s) installed on the end device that can be configured for the network server 106 by an end device provider out-of-band from provisioning an end device during activation of an LRR end device in an LPWAN deployment.

In various embodiments, application servers 108a-108c can facilitate configuration of one or more applications to be executed for one or more of LRR end device(s) 102a-102d. In general, an application can be software, code, instructions, logic or the like that can be configured for an LRR end device in order to facilitate data collection, data reporting, interactions with one or more other devices (e.g., actuators, motors, pumps, lights, switches, etc.) that may be interconnected to the LRR end device, combinations thereof or the like. In various embodiments, application servers 108a-108c can be implemented as any hardware or software server or combination of servers, which may be running in a distributed or centralized manner in one or more datacenter environments, cloud environments, enterprise network environments, combinations thereof or the like.

In various embodiments, gateway 104 can include multiple transmitters, receivers and antennas to facilitate OTA RF communications with one or more of LRR end devices 102a-102d and one or more additional wired or wireless interfaces to facilitate communications with network server 106. In at least one embodiment, the RF communications can utilize the unlicensed (e.g., Wi-Fi) spectrum. In at least one embodiment, gateway 104 can facilitate Adaptive Data Rate (ADR), multichannel communications via multiple transmitters and/or receivers to facilitate simultaneous message exchanges with multiple LRR end devices. In some embodiments, multiple gateways can be deployed in communication system 100 and each LRR end device 102a-102d can potentially interconnect with multiple gateways to facilitate the exchange of communications between each LRR end device and network server 106.

In various embodiments, LRR end devices 102a-102d can be associated with any electronic devices wishing to initiate a flow in communication system 100 via some network. In at least one embodiment, LRR end devices 102a-102d can be configured to facilitate simultaneous Wi-Fi connectivity and cellular connectivity within communication system 100. The terms 'LRR', 'LRR device', 'LRR end device', 'end device', 'LRR mobile device' or variations thereof can be used herein in this Specification interchangeably and are inclusive of devices used to initiate a communication, such as a computer, an electronic device such as a meter (e.g., parking, utility, etc.), vending machine, appliance (e.g., oven, refrigerator, washer, heater, air conditioner, etc.), detector (e.g., fire, smoke, carbon monoxide, etc.), sensor (e.g., temperature, humidity, chemical, water, wind, pH, gas, pressure, velocity), thermostat, Internet of Things (IoT) device, etc., a personal digital assistant (PDA), a laptop or electronic notebook, a cellular telephone, an IP phone, an electronic device having cellular and/or Wi-Fi connection capabilities, a wearable electronic device or any other device, component, element, or object capable of initiating voice, audio, video, media, or data exchanges within communication system 100. LRR end devices 102a-102d may also be inclusive of a suitable interface to a human user such as a microphone, a display, a keyboard, or other terminal equipment.

LRR end devices 102a-102d may also be any device that seeks to initiate a communication on behalf of another entity or element such as a program, application, a database, or any other component, device, element, or object capable of initiating an exchange within communication system 100. Within communication system 100, IP addresses (e.g., for LRR end devices 102a-102d or any other element in communication system 100) can be assigned using Dynamic Host Configuration Protocol (DHCP), Stateless Address Auto-configuration (SLAAC), during default bearer activation processes, or any suitable variation thereof. IP addresses used within communication system 100 can include IP version 4 (IPv4) and/or IP version 6 (IPv6) IP addresses.

In various embodiments, LRR end devices 102a-102d can be configured as LoRa™ end devices according to LoRaWAN™ Protocol Specifications and/or any other LoRa™ Alliance Specifications to facilitate operation in a LoRaWAN™ or LPWAN environment. In various embodiments, gateway 104, network server 106 and application servers 108a-108c can be configured according to LoRaWAN™ Protocol Specifications and/or any other LoRa™ Alliance Specifications to facilitate communications and operations in a LoRaWAN™ or LPWAN environment. In various embodiments, a LRR end device configured for a LoRaWAN™ or LPWAN environment can operate at data rates from 0.3 kilobits per second (kbps) to 50 kbps in the unlicensed spectrum below 1 gigahertz (GHz) for a range of up to 30 kilometers (km), depending on communication bandwidth, structure density, landscape, other interfering devices in an environment, combinations thereof or the like.

In various embodiments, a LoRa™ end device can be configured according to a particular device class type as defined by the LoRa™ Alliance. The device classes can include: Class A, Class B and Class C. A Class A end device is characterized as a battery operated bi-directional communication device in which each uplink transmission from the device is followed by two short downlink 'receive windows', also referred to herein as 'receive slots'. The uplink transmissions can be determined by the Class A device itself. The operation of a Class A type device is considered the lowest power in comparison to Class B and Class C type devices. A Class B end device is characterized as a bi-directional communication device having scheduled downlink receive slots in addition to the two receive slots opened following an uplink transmission. A Class C end device is characterized as a bi-directional communication device having almost continuously open receive windows that only close when the device is transmitting.

For purposes of understanding certain embodiments of systems and methods disclosed herein, it is important to appreciate the technologies and data that may be associated with network communications in a LRR network environment. The following foundational information may be viewed as a basis from which the present disclosure may be properly explained. Such information is offered earnestly and for teaching purposes only and, therefore, should not be construed in a way to limit the broad applications for the present disclosure.

In general, an LRR end device operating in a LoRaWAN™ network environment follows a communication pattern in which each uplink transmission to a gateway or concentrator LoRaWAN™ network element is followed by the LRR end device opening two short receive (Rx) windows or slots during which the LRR end device can receive downlink transmissions from the gateway or concentrator. As discussed in further detail below, the start times for the receive windows are defined based on the end of a previous uplink transmission as a reference time. As referred herein in this Specification, the terms 'gateway' and 'concentrator' can be used interchangeably.

If the gateway intends to transmit a downlink transmission to a given LRR end device, it is to initiate the transmission precisely at the beginning of the two receive windows opened by the LRR end device following an uplink transmission of the LRR end device. Under the LoRaWAN™ Protocol Specification V1.0 (2015), a given LRR end device cannot perform another uplink transmission until one of two conditions is met: 1) the LRR end device has received a downlink transmission in a first or second receive window for a previous uplink transmission; or 2) the second receive window for a previous uplink transmission has expired. Thus, a given LRR end device is not required to receive a downlink transmission following an uplink transmission.

Referring to FIG. 1B, FIG. 1B is a simplified schematic diagram illustrating an example power profile 120 for a typical Class A LoRa™ end device. A typical Class A LoRa™ end device uses an ALOHA-type protocol (e.g., transmission slots scheduled by an end device based on its own transmit needs, which can have small random time basis variations) to facilitate bi-directional communications with a gateway As illustrated, an uplink transmission (TX) to a gateway for an uplink message of a typical Class A LoRa™ end device typically (typ.) consumes 32-40 milliamps (mA) of current with a transmit power of approximately 14 decibel-milliwatts (dBm) and sensitivity of −137 dBm. Following the uplink transmission, the end device enters a sleep state for one (1) second during which time the device typically consumes 1 microamp (µA) of current. Upon expiration of the sleep state, the typical Class A LoRa™ end device opens a first receive (RX) window, referred to herein as 'RX1', during which time the device typically consumes 11 ma of current during the first receive window and thereafter again enters the sleep state. Following the sleep state, the typical Class A LoRa™ end device opens a second receive window, referred to herein as 'RX2', which also typically consumes 11 mA of current. The time between opening the first receive window and opening the second receive window is approximately 1 second (sec.). Following the second receive window, the typical Class A LoRa™ end device again enters the sleep until it determines to send another uplink message.

The duration and power consumption during each of the first and second receive windows for a typical Class A LoRa™ end device is dependent on the time required by the end device's receiver to effectively detect a downlink preamble, which can be performed using Channel Activity Detection (CAD). In general, a typical Class A LoRA™ end device can use CAD for approximately 2 symbols such that a symbol lasts 1 millisecond (ms).

Many LRR end devices operate under an 'uplink-only' traffic assumption in which Device Originated (DO) traffic is transmitted in the uplink by a device but no downlink transmissions are received based on information transmitted in the uplink. In various embodiments, such uplink-only LRR end devices can include, but not be limited to, meters, detectors, sensors, combinations thereof or the like. Typical actions based on uplink data from such uplink-only LRR end devices can be used to control one or more devices in a surrounding environment, which can also be battery powered and/or running non-LoRa™ applications such as, for example, actuators, motors, pumps, cameras, video feeds, etc. In some cases, uplink-only LRR end devices can be constrained to needing downlink Device Terminated (DT) traffic only once every few months or even years (e.g., to perform operations such as OTA firmware upgrades, etc.).

For such an uplink-only LRR end device, opening up two receive windows following each uplink transmission without further differentiation for application after the device sends uplink traffic is undesirable and results in a wastage of power, which can be especially critical for the operation of low power end devices operating an a LPWAN.

In accordance with at least one potential embodiment, communication system 100 as illustrated in FIG. 1A can facilitate enabling a Power Saving Mode (PSM) for low power, battery operated LRR (e.g., LoRa™ Class A) end devices (e.g., any of LRR end devices 102a-102d), which may have predominantly DO (e.g., uplink) traffic. An LRR end device that is transitioned to a PSM can disable opening up one or both of its Rx windows/slots following any uplink transmissions that may occur for a duration of the PSM. In various embodiments, transitioning a given LRR end device to a PSM can be triggered by the network server 106 and/or an application server for an application running on the given LRR end device. Duration of a PSM is discussed in further detail below.

Transitioning a constrained (e.g., low power, battery operated) LRR end device to a PSM can provide a primary benefit of extending the battery life such a device. As a secondary benefit, enabling PSM can improve RF channel efficiency in an LPWAN deployment by improving the scalability of the network server 106, which can handle traffic for an increased number of LRR end devices. For example, by disabling the opening of receive windows for a number of LRR end devices, the unused spectrum that would have been occupied by the receive windows can be safely used by any LRR end devices that need to perform uplink transmissions.

By disabling one or both of the receive windows for an LRR end device, different levels of power savings can be realized for the device. For example, disabling the opening up of both Rx windows/slots following an uplink transmission for a PSM causes an LRR end device to transition into a sleep state following each uplink transmission for a particular duration of a particular PSM. The LRR end device can break the sleep state intermittently based on the device's need to perform uplink transmissions. In various embodiments, a given LRR end device can determine a need to perform uplink transmissions based on data generated and/or collected (e.g., sensed, detected, etc.) by the end device. Embodiments described herein do not put any constraints on uplink transmissions that may need to be performed by LRR end devices.

By disabling the opening up of both receive windows following each uplink transmission of an LRR end device while it is in PSM, the battery life of such a constrained device could be extended by 50% or more compared to current end devices typically operating in LPWAN environments. By disabling the opening up of only one of the receive windows following uplink transmissions that may occur while an LRR end device is in a PSM, power savings and extended battery life could still be realized, though the savings would be less than that for a PSM in which the opening up of both receive windows was disabled. Power savings can also be realized by disabling one or both receive windows over other power saving techniques such as Wake On Radio (WOR).

Generally, WOR is used for power saving in which a device will periodically transition to a receiver mode to detect whether there is wake-up signal or preamble indicating to a device to wake from a sleep state. In a LoRa™ deployment, CAD can be used by a LoRa™ end device to detect downlink transmissions. Consider an example power consumption analysis for an example LoRa™ end device involving downlink transmissions for a 125 kilohertz (KHz) channel bandwidth having an equivalent 5.47 kilobits per second (kbps) data rate for a Spreading Factor (SF) of 7 (SF7) and Coding Rate (CR) of 4/5 (CR4/5), as defined in LoRa™ Specifications, such that each symbol=1 ms. If using a WOR power saving mechanism, the example LoRa™ device could detect a wake-up signal/preamble in a duration of approximately two symbols. Power consumption of the device in terms of current (e.g., mA) can be approximated as 11 mA for first symbol and as 5.5 mA for the second symbol such that power consumption of the example LoRa™ end device using CAD to detect the WOR wake-up signal/preamble such that: 11 mA+5.5 mA=16.5 mA. Thus, a LoRa™ end device still consumes power using a WOR mechanism and, further, would have to wait for a wake-up signal/preamble to perform uplink transmissions. In contrast, embodiments described herein, provide for disabling one or both receive windows in which downlink transmissions can be sent for a particular duration, which can provide power savings over WOR techniques, and uplink transmissions can be sent by a LRR end device whenever the device determines that it needs to perform an uplink transmission, rather than having to wait on receiving a wake-up signal/preamble.

During operation, in accordance with various embodiments described herein, the network server 106 or a given application server (e.g., any of application servers 108a-108c) associated with an application running on a particular LRR end device can determine a need to transition a particular LRR end device to a PSM during an Activation procedure for the particular LRR end device within a LPWAN deployment (e.g., upon receiving a Join-Request from the device for a Join or ReJoin procedure for the device) and/or at any time when an uplink transmission occurs for the particular LRR end device and it is determined that the device is not, but should be, in a PSM.

For various embodiments discussed herein, transitioning a particular LRR end device to a PSM can involve a request/response messaging exchange in which the network server 106 via gateway 104 sends a PSM request to the particular LRR end device requesting that the LRR end device transition to a PSM configured according to PSM parameters identified in a payload of the PSM request. In various embodiments, the particular LRR end device can send a response to the network server 106 acknowledging either: 1) that the device has transitioned to the PSM as configured according to the PSM parameters identified in the PSM request or 2) that the device has transitioned to another PSM that is configured according to PSM parameters locally configured for the end device and/or an application running on the end device. For example, expected downlink transmit characteristics for an application installed on an LRR end device may cause the device to override PSM parameters received in a PSM request in lieu of locally configured PSM parameters.

An LRR end device will operate in a PSM for a duration as identified by PSM parameters associated with the PSM. While operating in the PSM, the LRR end device will continue to perform uplink transmissions based on need determined by the end device itself and will not open at least one window as set by PSM parameters associated with the PSM. Upon expiration of the duration of the PSM, the LRR end device can transition to back to its normal operation in which each uplink transmission is followed by opening up two receive windows; however, the LRR end device can be transitioned back to a PSM as desired by the network server 106 and/or an application server associated with an application running on the device.

PSM parameters for a PSM can be used to define operation of an LRR end device while in the PSM. In various embodiments, PSM parameters can be formatted using one or more byte(s) in which one or more bit position(s) of the one or more byte(s) corresponds to particular PSM parameters. In various embodiments, PSM parameters associated with a PSM can include any combination of: an identification of a duration type associated with a PSM; an identification of a time unit or format for a duration associated with a PSM; an identification of a duration value for a duration type identified for a PSM; an identification of at least one receive window that will not be opened up while an LRR end device is operating in a PSM; and/or an identification of a PSM Type to which an LRR end device can be transitioned based on an application running on the LRR end device.

In various embodiments, duration of a PSM can identify a period of time during which an LRR end device is to remain in a PSM or can identify a number of uplink transmissions that an LRR end device is to perform while in a PSM. In at least one embodiment, one bit can be set in PSM parameters to identify a duration type such that a duration identified in the PSM parameters is associated with a period of time or is associated with a number of uplink transmissions (e.g., a bit being set to '0' can identify a time-type duration associated with a period of time and the bit being set to '1' can identify a transmission-type duration associated with a number of uplink transmissions, or vice-versa). Additional bits can be set in PSM parameters for a PSM to identify a duration value (e.g., period of time or number of uplink transmissions) associated with a duration type identified in the PSM parameters.

As noted, a transmission-type duration can be configured for PSM parameters associated with a PSM to identify a number of uplink transmissions that an LRR end device is to perform while in the PSM.

In various embodiments, a time-type duration can be configured for PSM parameters associated with a PSM to identify a number of seconds, minutes, hours, days or any combination thereof for a period of time during which an LRR end device is to remain in the PSM. In at least one embodiment, a time unit or format indication for a time-type duration can be included in PSM parameters for a PSM. In some embodiments, a number of bits included in PSM parameters for a PSM can be used to identify whether a time duration for the PSM corresponds to seconds, minutes, hours or days (e.g., two bits being set to '00' can correspond to a number of seconds duration, being set to '01' can correspond to a number of minutes duration, being set to '10' can correspond to a number of hours duration and being set to '11' can correspond to a number of days duration, or any combination thereof). In still some embodiments, a number of bits included in PSM parameters for a PSM can be used to identify a time format for a time duration for the PSM (e.g., a minutes and seconds duration, an hours and minutes duration, a days and hours duration, or any combined format of seconds, minutes, hours or days).

In addition to duration information (e.g., duration type, time unit/format and/or duration value), PSM parameters for a PSM can include an identification of at least one receive window that will not be opened while an LRR end device is operating in the PSM. In various embodiments, a number of bits can be set in PSM parameters associated with a PSM to identify one or both receive windows for which opening is to be disabled while an LRR end device is in the PSM. For example, in at least one embodiment two bits can be set to identify whether opening-up of the first receive window, the second receive window or both receive windows is to be disabled following each uplink transmission while an LRR end device is operating in a particular PSM (e.g., two bits being set to '01' can correspond to disabling opening up of the first receive window, being set to '10' can correspond to disabling opening up of the second receive window and being set to '11' can correspond to disabling opening up of both receive windows, or any combination thereof).

Aside from duration information and receive window information (e.g., first, second or both), in still some embodiments, PSM parameters can be configured to identify a locally configured PSM Type for one or more PSM Type(s) that may be configured for an LRR end device and/or one or more applications running on the LRR end device. As noted for various embodiments described herein, network server 106 can be configured with one or more contract(s) that provide configuration data that can be associated with LRR end devices and/or one or more application(s) installed on the end devices that are deployed in an LPWAN by a particular end device provider. In various embodiments, configuration data provided for a contract can define operating characteristics (e.g., expected uplink/downlink transmit periodicity, transmit data size, etc.), RF characteristics (e.g., transmit power, frequency/channel selection information, etc.), combinations thereof or the like.

In some embodiments, configuration data for a contact may also be configured to identify one or more application-specific PSM Type(s) that can be enabled for LRR end devices (e.g., any of LRR end devices 102a-102d) that may be deployed by a particular end device provider. In still some embodiments, standardized PSM Types (e.g., as may be defined by the LoRa™ Alliance or other standards organization) may be configured for one or more LRR end devices, network server 106 and/or one or more application servers 108a-108c deployed for a LoRa™ architecture or the like. Thus, in various embodiments, LRR end devices can be locally configured with one or more PSM Type(s) according to one or more contract(s) and/or standards such that the LRR end devices can transition to a particular PSM Type upon request by the network server 106.

For example, in various embodiments, a number of PSM Type(s) can be configured for a contract such that each PSM Type can include PSM parameters locally configured on LRR end devices identifying duration information and receive window information for each PSM Type. In at least one embodiment, network server 106 can be configured to transition an LRR end device that is locally configured with one or more PSM Type(s) according to a provider contract by setting one or more bits in PSM parameters of a PSM request sent to the LRR end device that identify a corresponding PSM Type as configured by the contract. Similar operations could be performed using PSM Type(s) that were standardized for a LoRa™ or similar architecture.

In a LoRaWAN™ or other LoRa™ architecture, uplink and downlink messaging between LRR end devices 102a-102d and network server 106 via gateway 104 and other operations can be facilitated using Protocol Specifications as defined by the LoRa™ Alliance. A brief discussion regarding Activation of an LRR end device configured according to the LoRaWAN™ Protocol Specification V1.0 (2015) and messaging in a LoRaWAN™ or other LoRa™ environment is provided below.

As described in the LoRaWAN™ Protocol Specification V1.0 (2015), an end device has to be personalized and activated to participate in a LoRaWAN™ network. Activation can be performed in one of two ways using either Over-The-Air-Activation (OTAA), which encompasses Join or ReJoin procedures, or Activation By Personalization (ABP). Following Activation, an end device is to store its device address (DevAddr), a global application identifier (AppEUI), a network session key (NwkSKey) and an application session key (AppSKey). In general, an end device has to perform a new Activation procedure every time it loses session context information.

The DevAddr can consist of 32 bits and identify the end device within its current network; the application identifier identifies the application provider (e.g., for an application running in an application server) or owner of the end device; the network session key is a key specific to the end device to ensure data integrity between the end device and the network server for all data messages using a Message Integrity Code (MIC) and to encrypt/decrypt the payload field of Medium Access Control-only (MAC-only) data messages; and the application session key is a key specific to the end device used by the network server to encrypt/decrypt the payload field of application-specific data messages and to calculate and verify an application-level MIC of application-specific data messages.

According to the LoRaWAN™ Protocol Specification V1.0 (2015), all LoRa™ uplink and downlink Physical (PHY) Layer data messages carry a Preamble, a physical header, a physical header plus a header Cyclic Redundancy Check (PHDR_CRC) and a PHY payload (PHYPayload). Uplink messages can carry an optional CRC. Data messages can be used to transfer both Medium Access Control (MAC) commands and application data, which, in some cases, can be combined together in a single message. In general, a MAC command can be used to signal a request for LoRaWAN™ operations to be performed by an end device and/or a network server and/or to signal a response to a request. MAC commands are performed between an end device and a network server transparent to a gateway with termination at the network server for signaling from an end device. TABLE 1 below illustrates example details that can be associated with an example LoRa™ data message format.

TABLE 1

EXAMPLE LoRa ™ PHY MESSAGE FORMAT

| Preamble | PHDR | PHDR_CRC | PHYPayload | CRC (opt) |

The PHYPayload starts with a single octect MAC header (MHDR), followed by a MAC Payload (MACPayload), and ends with a 4-octet Message Integrity Code (MIC). TABLE 2, below, illustrates example details associated with an example format of the PHYPayload of an example LoRa™ data message.

TABLE 2

EXAMPLE PHYPayload FORMAT

| MHDR | MACPayload | MIC |

The MHDR can be used to specify a message type (MType) (e.g., Join-Request, Join-Accept, (unconfirmed or confirmed) Data-Up, (unconfirmed or confirmed) Data-Down, Proprietary, etc.) and the frame format for which a message has been encoded according to the major version (e.g., V1.0) of the LoRaWAN™ Protocol Specification to which the message complies. The maximum length that can be used for the MACPayload can vary depending on the data rate for an LRR end device between 59 and 230 bits. In various embodiments, the MIC for a message can be calculated over all fields present in a message using an algorithm as defined in Request For Comments (RFC) 4493 in which Cipher-based Message Authentication Code (CMAC) using the 128-bit Advanced Encryption Standard (AES) can provide for calculating the MIC for a message.

The MACPayload of a data message, sometimes referred to interchangeably as 'data frame', starts with a frame header (FHDR), followed by an optional port field (FPort), which is followed by an optional frame payload field (FRMPayload). TABLE 3, below, illustrates example details that can be associated with an example format of the MACPayload of an example LoRa™ data message or frame.

TABLE 3

EXAMPLE MACPayload FORMAT

| FHDR | FPort | FRMPayload |
| --- | --- | --- |

The FHDR contains the device address of an end device (DevAddr), a frame control octet (FCtrl), a two-octet frame counter (FCnt) and up to 15 octets of frame options (FOpts), which can be used to transport MAC commands piggy-backed onto data messages or frames. The FPort field can be used to indicate whether the FRMPayload contains only MAC commands or application-specific information. When the FPort field is set to zero (0), the FRMPayload is to contain only MAC commands. FPort values of 1-223 (e.g., 0x01-0xDF) are application-specific values that can be used to indicate application-specific information in the FRMPayload.

TABLE 4, below, illustrates example details that can be associated with an example FHDR of an example LoRa™ data message or frame. For TABLE 4, the size or potential size in bytes of each field is shown in parentheses.

TABLE 4

EXAMPLE FHDR FORMAT

| DevAddr (4) | FCtrl (1) | FCnt (2) | FOpts (0-15) |
| --- | --- | --- | --- |

The device address (DevAddr) of an end device was discussed previously. Depending on whether a data message is an uplink or downlink data message, the bits of the FCtrl octet can be used to identify ADR control of the end device, to request an ADR Acknowledgment, to acknowledge receipt of a confirmed data message, to indicate whether additional downlink frames are pending for an end device, and/or a length of the FOpts field. The FCnt field can track the number of uplink data frames or messages sent to the network server (e.g., FCntUp) and/or the number of downlink data frames or messages received from the network server (e.g., FCntDown). As noted above, the FOpts field(s) can be used to carry MAC commands. A confirmed data message is a message that has to be acknowledged by the recipient of the message, while an unconfirmed data message does not require such acknowledgment.

Returning to the embodiment of FIG. 1A, during operation in a LoRaWAN™ or other LoRa™ environment, the network server 106 or a given application server associated with an application running on a particular LRR end device (e.g., any of LRR end devices 102a-102d) can determine a need to transition the particular LRR end device to a PSM. In various embodiments, the determination can be triggered based on one or more trigger criteria being met, which can include, but not be limited to: identification of an application running on the end device (e.g., which can be determined from the FPort field and/or the AppEUI for the uplink data message) that triggers initiating a PSM for the end device; identification a policy or contract associated with the end device (e.g., associated with an application running on the end device) that triggers initiating a PSM for the end device; and/or the downlink data flow that is expected to be sent to the end device (e.g., little or no downlink messages are expected to be sent to the device).

As noted, a determination of a need to transition a particular LRR end device to a PSM can be triggered during Activation of the particular LRR end device within a LoRaWAN™ or other LoRa™ environment (e.g., upon receiving a Join-Request from the device for a Join or ReJoin procedure for the device) and/or at any time when an uplink transmission occurs for the particular LRR end device and the device is not, but should be, in a PSM.

Upon determining the need to transition a particular LRR end device to a PSM, the network server 106 can send a PSM request to the end device requesting that the end device transition to the PSM using a new LoRa™ MAC command referred to herein as a 'PowerSaveReq' MAC command. The PowerSaveReq MAC command can be identified using a Command Identifier (CID) in a range of 0x80-0xFF, which has been set aside in the LoRaWAN™ Protocol Specification for proprietary MAC commands. As referred to herein in this Specification, a PowerSaveReq MAC command can be referred to interchangeably as a PSM request.

The network server 106 can send a PowerSaveReq MAC command to a particular LRR end device using either the first or second receive window (RX1 or RX2) that the particular LRR end device opens up following an uplink transmission from the end device. In one embodiment, a PowerSaveReq MAC command can be sent to an end device by piggybacking the command in the FOpts field of a downlink data message from the network server 106. A piggybacked MAC command is not encrypted and cannot exceed 15 octets and the FRMPayload for a piggybacked MAC command can, in some cases, be empty. In another embodiment, a PowerSaveReq MAC command can be sent to an end device as a separate data frame in the FRMPayload with the FPort field being set to zero (0). MAC commands sent within the FRMPayload are always encrypted and cannot exceed the maximum FRMPayload length.

A PowerSaveReq MAC command can include a payload in which one or more PSM parameters can be set to identify a configuration of a PSM requested by the network server 106. In one embodiment, a PowerSaveReq MAC command can have a Request type payload of 2 bytes. However, in other embodiments, the command can have a payload of more or less bytes (e.g., depending on the PSM parameters identified in the payload). The format of PSM parameters for a PowerSaveReq MAC command can vary depending on the information identified in the PSM parameters for the command.

In at least one embodiment, PSM parameters associated with a PowerSaveReq MAC command payload can include duration information (e.g., duration type, time unit/format and/or duration value for a PSM) and receive window information (e.g., first, second or both to disable for a PSM), as discussed for various embodiments described herein. In another embodiment, PSM parameters associated with a PowerSaveReq MAC command payload can include PSM Type information (e.g., PSM Type 1, PSM Type 2, etc.), as discussed for various embodiments described herein. Formatting for different PowerSaveReq MAC command payloads is discussed in further detail below for FIGS. 2A-2D.

Upon receiving a PowerSaveReq MAC command by a particular LRR end device, the MAC layer for the end device can process the command and payload information to transition to a PSM. In various embodiments, processing a PowerSaveReq MAC command and associated payload by an end device can include the end device transitioning to the PSM as configured according to the PSM parameters identified in the payload for the command or analyzing the command and associated payload in comparison to any PSM parameters locally configured for the end device. Depending on the processing of a command and payload, the LRR end device can send an acknowledgment response to the network server 106 using a new 'PowerSaveAns' MAC command, which may or may not have a payload.

In accordance with one embodiment, if there are no PSM parameters locally configured for a particular LRR end device, the particular LRR end device can send a PSM response to the network server 106 acknowledging that the end device has transitioned to the PSM as configured according to the PSM parameters identified in the PSM request using a PowerSaveAns MAC command that has only a PowerSaveAns MAC command CID and no payload (e.g., no FPort present and no FRMPayload present in the MACPayload). A PowerSaveAns MAC command can be identified using a CID in a range of 0x80-0xFF but which is different from a CID corresponding to a PowerSaveReq MAC command CID.

In accordance with another embodiment, if there are PSM parameters locally configured for a particular LRR end device, the end device can determine whether any locally configured PSM parameters (e.g., duration information and/or receive window information) are different from PSM parameters contained in the payload of a PowerSaveReq MAC command received from the network server 106. If there are any different PSM parameters, the LRR end device can determine to override the received PSM parameters with its own locally configured PSM parameters that are different and can transition to a PSM mode as characterized by its locally configured PSM parameters. The LRR end device can send a PowerSaveAns MAC command to the network server 106 acknowledging that the device has transitioned to a PSM and the response can include a payload that includes the parameters locally set by the LRR end device for the PSM so that the network server can track the duration set for the PSM based on the locally configured PSM parameters. If there are no different PSM parameters, the LRR end device can respond with a PowerSaveAns MAC command that has no payload.

While an LRR end device is in a PSM it will continue perform uplink transmissions based on need determined by the device but will not open the at least one receive window for each uplink transmission as configured for the PSM via the PSM parameters. As discussed for various embodiments described herein, a given LRR end device can determine a need to perform uplink transmissions based on data generated and/or collected (e.g., sensed, detected, etc.) by the end device. Embodiments described herein do not put any constraints on uplink transmissions that may need to be performed by LRR end devices.

The network server 106 will not attempt to send any downlink transmissions to an LRR end device while it is in a PSM for any receive window(s) that have been disabled for the PSM. For the periods in which an LRR end device is not transmitting uplink messages or opening a particular receive window(s), the device will remain in a sleep state and draw sleep state current of approximately 1 µA. Upon expiration of the duration of a PSM for an LRR end device, the end device can transition back to its normal operation of opening up two receive windows following each uplink transmission. The network server 106 and/or application server associated with an application running on the LRR end device can send any downlink data to the end device and/or determine to transition the device back to the PSM using the techniques discussed for various embodiments described herein.

In various embodiments, the system and method discussed for various embodiments described herein can be backward compatible with existing or non-supported LRR end devices. For example, an acknowledgment that a given LRR end device has transitioned to a PSM is needed for various operations described herein to determine whether the device is operating in a PSM. An LRR end device that does not support PSM operations would merely ignore a PSM request received from the network server and not acknowledge transitioning to a PSM. If the network server 106 does not receive an acknowledgment to a PSM request sent to a particular LRR end device, it can identify the device as not supporting PSM operations.

In some embodiments, transitioning a LRR end device to a PSM can be similar to the device being in a power-off or sleep-state such that the device is considered to be registered within the network. When the device determines the need to send uplink transmissions while in a PSM, it does not need to Rejoin or Join the network. Although an LRR end device in a PSM may not be reachable for Device Terminating services, control for reachability for LRR end devices can remain with the network server 106, which can determine how much and/or for what duration a particular LRR end device is to be in a PSM.

Turning to FIGS. 2A-2D, FIGS. 2A-2D are simplified schematic diagrams illustrating example details that can be associated with various example PowerSaveReq MAC command payloads that can be sent from network server 106 in accordance with various potential embodiments of communication system 100. Various example PSM parameters that can be identified in the various example command payloads shown in FIGS. 2A-2D are illustrated for various bit positions of the payloads. Bit positions are identified above example PSM parameter(s) illustrated for each example command payload for each of FIGS. 2A-2D. Although FIGS. 2A-2D are described in relation to example PowerSavReq MAC command payloads, formatting of PowerSaveAns MAC command payloads can be performed in a similar manner as described for the example PowerSaveReq MAC command payloads depending on the PSM parameters identified for a PSM request.

The embodiment of FIG. 2A illustrates a first example format that can be associated with a first example PowerSaveReq MAC command payload 210 that may be configured according to one example embodiment of communication system 100. The first example PowerSaveReq MAC command payload 210 has a length of two (2) bytes. In one embodiment, bit [15] of payload 210 can be used to identify a duration type associated with a PSM; and bits [14:0] can be used to identify a duration value for the duration type identified at bit [15].

For the embodiment shown in FIG. 2A, it is assumed that if a time-type duration is identified that both the network server 106 and the LRR end devices to which the command payload is sent are configured to identify the same time unit (e.g., seconds, hours, days, etc.) and/or time format for the duration value included in the payload. Further for the embodiment shown in FIG. 2A, it is assumed that the LRR end device will automatically disable opening up both receive windows following each uplink transmission for the duration of the PSM.

Figure 2B:
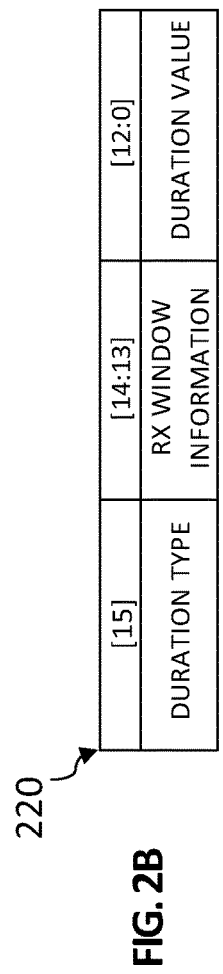

The embodiment of FIG. 2B illustrates a second example format that can be associated with a second example PowerSaveReq MAC command payload 220 that may be configured according to one example embodiment of communication system 100. The second example PowerSaveReq MAC command payload 220 has a length of two (2) bytes. In one embodiment, bit [15] of payload 220 can be used to identify a duration type associated with a PSM; bits [14:13] can be used to identify receive window information for the PSM (e.g., to identify at least one receive window that will not be opened during the PSM); and bits [12:0] can be used to identify a duration value for the duration type identified at bit [15]. For the embodiment shown in FIG. 2B, it is assumed that if a time-type duration is identified that both the network server 106 and the LRR end devices to which the command payload is sent are configured to identify the same time unit (e.g., seconds, hours, days, etc.) and/or time format for the duration value identified in the payload.

Figure 2C:
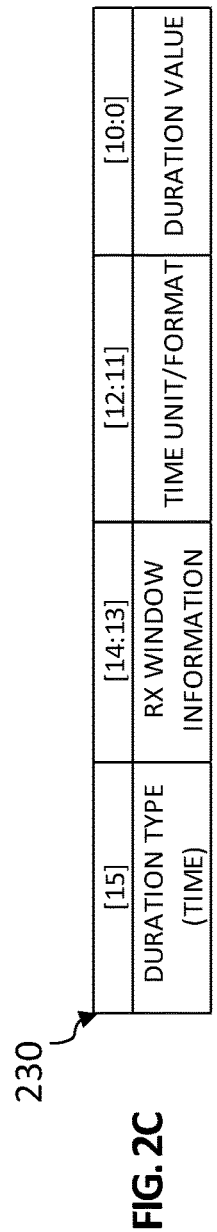

The embodiment of FIG. 2C illustrates a third example format that can be associated with a third example PowerSaveReq MAC command payload 230 that may be configured according to one example embodiment of communication system 100. The third example PowerSaveReq MAC command payload 230 has a length of two (2) bytes. It is assumed for the embodiment of FIG. 2B that the third example PowerSaveReq MAC command payload 230 is associated time-type duration identified in the payload. In one embodiment, bit [15] of payload 230 can be used to identify a duration type (e.g., time) associated with a PSM; bits [14:13] can be used to identify receive window information for the PSM (e.g., to identify at least one receive window that will not be opened during the PSM); bits [12:11] can be used to identify a time unit or format for a duration value and bits [10:0] can identify the duration value.

Figure 2D:
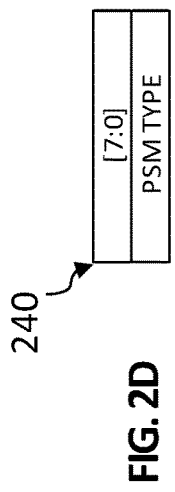

The embodiment of FIG. 2D illustrates a fourth example format that can be associated with a fourth example PowerSaveReq MAC command payload 240 that may be configured according to one example embodiment of communication system 100. The fourth example PowerSaveReq MAC command payload 240 has a length of 1-byte and it is assumed for the embodiment of FIG. 2D that the fourth example PowerSaveReq MAC command payload 240 is associated with identifying one or more PSM Type(s) for an associated PSM request sent from network server 106. As discussed herein, in some embodiments network server 106 and one or more of LRR end devices 102a-102d can be configured with PSM parameters for one or more PSM Type(s) that can be based on one or more contract(s) and/or standards-based PSM Type configurations configured for communication system 100.

The embodiments of FIGS. 2A-2D illustrate only a few of the many possible formats for communicating PSM parameters to one or more LRR end devices. It should be understood that any format, order, bit or byte alignment and/or PSM parameters described herein or the like that can be sent to LRR end devices in one or more payloads are within the scope of the teachings of the present disclosure.

Turning to FIGS. 3A-3C, FIGS. 3A-3C are simplified schematic diagrams illustrating example details that can be associated example power profiles that can be realized for long range radio end devices for various potential embodiments of communication system 100. In particular, FIGS. 3A-3C illustrate different example power profiles that can be realized by selectively disabling the opening up of one or both downlink receive (RX) windows following uplink transmissions (TX) for example PSMs that can be enabled for LRR end devices within communication system 100.

The embodiment shown in FIG. 3A, illustrates an example power profile 310 for which it is assumed that a given LRR end device has transitioned to a PSM in which no downlink receive windows are to be opened following each uplink transmission by the end device. Accordingly, the LRR end device enters a sleep state following each uplink transmission and remains in the sleep state until the device determines the need to perform another uplink transmission.

The embodiment shown in FIG. 3B, illustrates an example power profile 320 for which it is assumed that a given LRR end device has transitioned to a PSM in which only the first downlink receive window (RX1) is to be opened following each uplink transmission by the end device. Accordingly, the LRR end device enters a sleep state for 1 second (1 s) following each uplink transmission and then opens RX1. The duration of RX1 can depend on the time required by the end device's receiver to effectively detect a downlink preamble, if a downlink transmission was sent to the end device. Following the opening of RX1, the end device can again enter the sleep state and remain in the sleep state until the device determines the need to perform another uplink transmission.

The embodiment shown in FIG. 3C, illustrates an example power profile 330 for which it is assumed that a given LRR end device has transitioned to a PSM in which only the second downlink receive window (RX2) is to be opened following each uplink transmission by the end device. Accordingly, the LRR end device enters a sleep state for 2 seconds (2 s) following each uplink transmission and then opens RX2. The duration of RX2 can depend on the time required by the end device's receiver to effectively detect a downlink preamble, if a downlink transmission was sent to the end device. Following the opening of RX2, the end device can again enter the sleep state and remain in the sleep state until the device determines the need to perform another uplink transmission.

Accordingly, the embodiments of FIGS. 3A-3C illustrate different example power profiles that can be realized by selectively disabling the opening up of one or both downlink receive windows following uplink transmissions for different example PSMs that can be enabled for LRR end devices within communication system 100. By providing for the ability to selectively disable downlink receive windows, the system and method provided by communication system 100 can provide different levels of power savings for LRR end devices in various embodiments.

Figure 4:
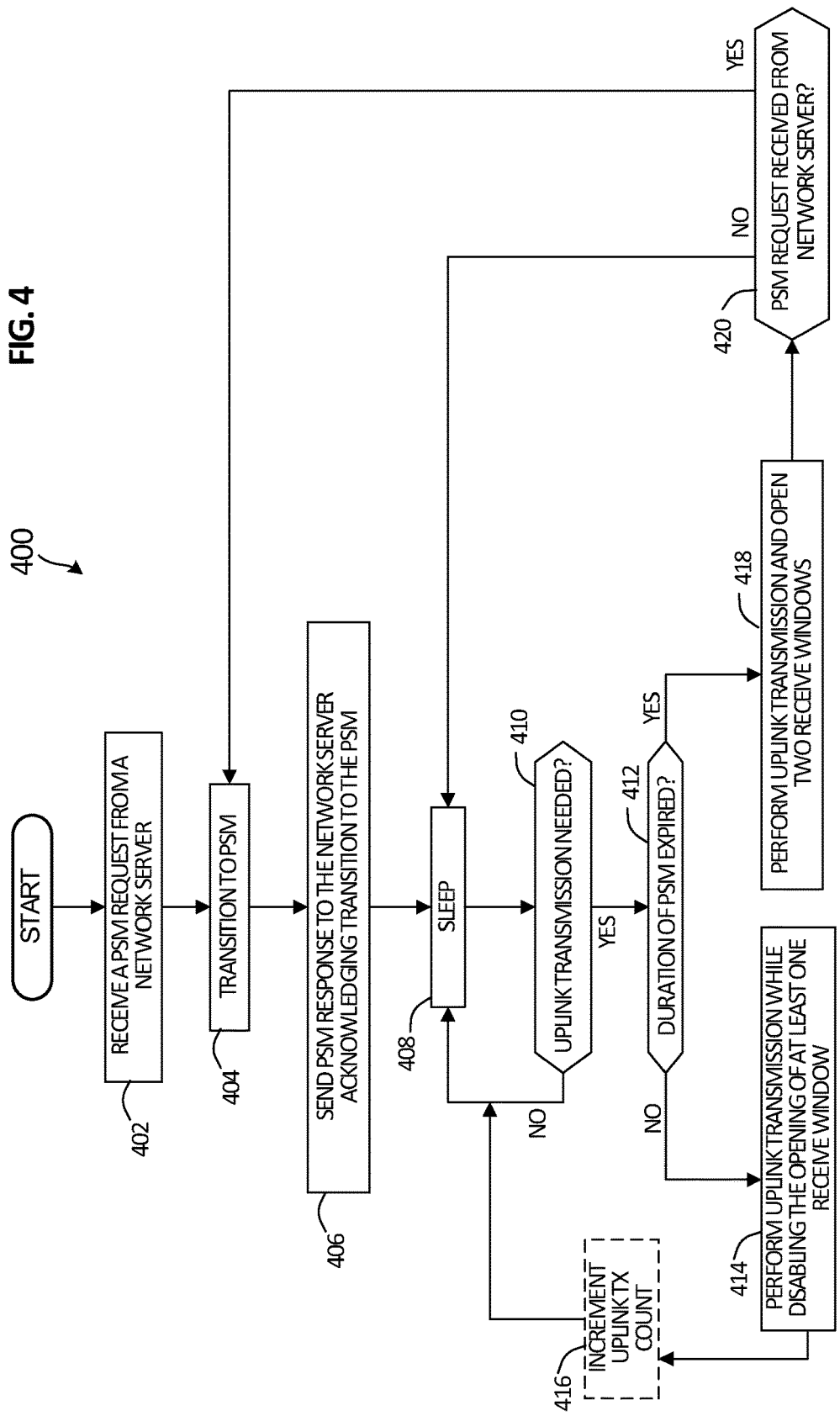
FIG. 4 is a simplified flow diagram illustrating example details that can be associated with example operations that can facilitate power management in a long range radio network environment in accordance with one potential embodiment of the communication system.

Referring to FIG. 4, FIG. 4 is a simplified flow diagram illustrating example details that can be associated with example operations 400 that can facilitate power management in a long range radio network environment in accordance with one potential embodiment of communication system 100. In particular, the embodiment of FIG. 5 can be associated with operations performed by a particular LRR end device say, for example, LRR end device 102a, to transition the LRR end device say to a PSM in accordance with one example embodiment of communication system 100. The embodiment of FIG. 4 assumes that LRR end device does not have any pre-configured, locally stored PSM parameters. Although operations 400 are described in relation to LRR end device 102a, it should be understood that any of LRR end devices 102b-102d and/or any other LRR end devices that may be deployed in communication system 100 can operate in a similar manner as described herein for the embodiment of FIG. 4.

At 402, the operations can include LRR end device 102a receiving a PSM request from network server 106 via gateway 104. In at least one embodiment, the PSM request can be a PowerSaveReq MAC command that includes a payload of one or more PSM parameters that identify, at least in part, at least one receive window to disable for LRR end device 102a for multiple uplink transmissions to be transmitted by the end device while in the PSM and a duration for the PSM. In other embodiments, the PSM request can include other PSM parameters as discussed for various embodiments described herein.

At 404, the operations can include LRR end device 102a transitioning to the PSM as requested by the network server 106. In at least one embodiment, transitioning to a PSM by an LRR end device can include the device storing PSM parameters that were identified in a payload associated with the PSM request received from the network server. For example, in at least one embodiment, transitioning to a PSM by an LRR end device can include disabling at least one receive window from being opened up following uplink transmissions by the end device for the duration of the PSM. In at least one embodiment, transitioning can also include starting a timer based on a time-type duration identified in PSM parameters for a PSM request. In still another embodiment, transitioning can also include initializing an uplink transmission counter to zero in order to locally maintain a count of uplink transmissions when a transmission-type duration is identified in PSM parameters for a PSM request.

At 406, the operations can include LRR end device 102a generating and sending a PSM response to the network server 106 acknowledging transition to the PSM. In at least one embodiment, the acknowledgment can include generating and sending a PowerSaveAns MAC command that does not include a payload. The disabling the opening of at least one downlink receive window as may be identified in the PowerSaveReq MAC command for the PSM can be performed by the LRR end device 102a for the PSM following the uplink transmission of the PSM response to the network server 106.

At 408, the operations can include LRR end device 102a entering a sleep state until the device determines a need at 410 to perform an uplink transmission. As discussed for various embodiments described herein, an uplink transmissions performed by an LRR end device will be unaffected by the end device being an a PSM; thus, an end device can determine to send an uplink transmission based on data generated, collected, sensed, detected, etc. based on one or more application running on the end device, a configuration of the end device, combinations thereof or the like. If LRR end device 102a does not determine a need to perform an uplink transmission, the device remains in the sleep state.

If LRR end device 102a does determine a need to perform an uplink transmission, the operations can continue to 412 in which the LRR end device 102a determines whether the duration of the PSM has expired. In various embodiments, the determination at 412 can include an LRR end device checking an internal clock in comparison to a time-type duration set for a PSM or checking an internal uplink transmission count in comparison to a transmission-type duration set for a PSM.

If LRR end device 102a determines that the duration of the PSM has not expired at 412, the operations can continue to 414 at which LRR end device 102a performs the uplink transmission while disabling the opening of at least one downlink receive window as identified in the PSM parameters associated with the PSM request. Following the uplink transmission, the operations can return to 408 at which the LRR end device returns to the sleep state and awaits the need to perform another uplink transmission and the operations can continue as described herein. In at least one embodiment, LRR end device 102a can increment an uplink transmission count at 416 for its locally maintained uplink transmission count (e.g., if the PSM parameters identified a transmission-type duration) before returning to the sleep state at 408.

If LRR end device 102a determines that the duration of the PSM has expired at 412, the operations can continue to 418 at which LRR end device 102a performs the uplink transmission and opens two downlink receive windows, as it would during normal operation. Following the uplink transmission, the operations can continue to 420 at which the LRR end device 102a determines whether it has received another PSM request from the network server 106 (e.g., received during one of the two downlink receive windows that it opened up following the uplink transmission).

If LRR end device 102a determines that it has received another PSM request from the network server at 420, the operations can return to 404 at which the LRR end device 102a transitions back to a PSM as requested by the network server 106. The new PSM may or may not have the same PSM parameters as the previous PSM for the LRR end device. Thus, in various embodiments, the transitioning at 404 can include any of operations discussed above.

If LRR end device 102a determines that it has not received another PSM request from the network server at 420, the operations can return to 408 at which the LRR end device returns to the sleep state and awaits the need to perform another uplink transmission and the operations can continue such that the LRR end device continues to perform uplink transmissions followed by opening two downlink receive windows until the end device is transitioned back to a PSM as requested by the network server.

Figure 5:
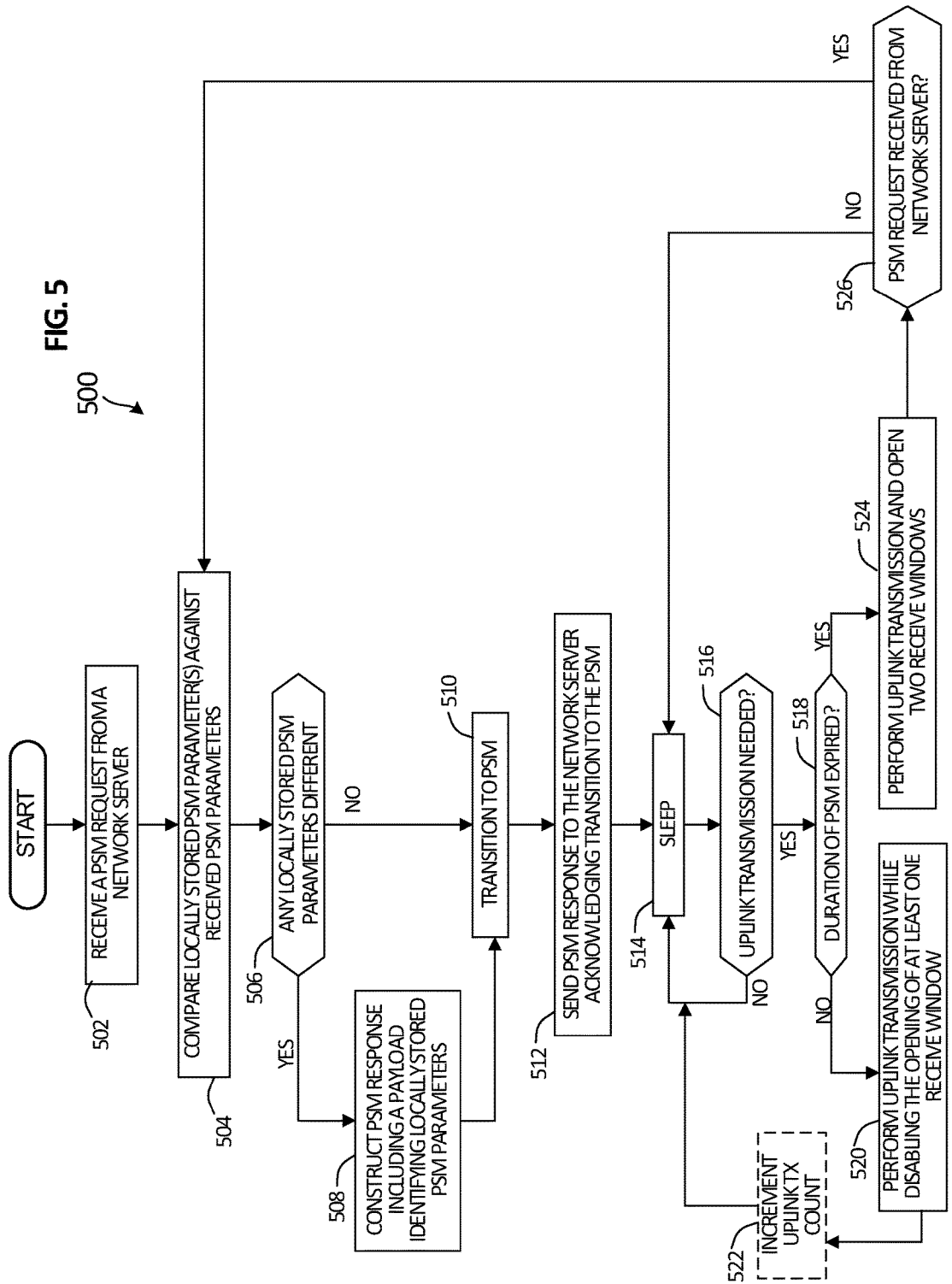
FIG. 5 is a simplified flow diagram illustrating other example details that can be associated with example operations that can facilitate power management in a long range radio network environment in accordance with one potential embodiment of the communication system.

Referring to FIG. 5, FIG. 5 is a simplified flow diagram illustrating other example details that can be associated with example operations 500 that can facilitate power management in a long range radio network environment in accordance with one potential embodiment of communication system 100. In particular, the embodiment of FIG. 5 can be associated with operations performed by a particular LRR end device say, for example, LRR end device 102a, to transition the LRR end device say to a PSM in accordance with one example embodiment of communication system 100. The embodiment of FIG. 5 assumes that LRR end device has one or more pre-configured, locally stored PSM parameters. Although operations 500 are described in relation to LRR end device 102a, it should be understood that any of LRR end devices 102b-102d and/or any other LRR end devices that may be deployed in communication system 100 can operate in a similar manner as described herein for the embodiment of FIG. 5.

At 502, the operations can include LRR end device 102a receiving a PSM request from network server 106 via gateway 104. In at least one embodiment, the PSM request can be a PowerSaveReq MAC command that includes a payload of one or more PSM parameters that identify, at least in part, at least one receive window to disable for LRR end device 102*a* for multiple uplink transmissions to be transmitted by the end device while in the PSM and a duration for the PSM. In other embodiments, the PSM request can include other PSM parameters as discussed for various embodiments described herein.

At 504, the operations can include LRR end device 102*a* performing a comparison for any locally stored PSM parameters against PSM parameters for the PSM request received from the network server. At 506, the LRR end device 102*a* determines whether any locally stored PSM parameters differ from the received PSM parameters.

If LRR end device 102*a* determines that there are any locally stored PSM parameter(s) that differ from the received PSM parameters, the operations can continue to 508 at which the LRR end device generates a PSM response (e.g., a PowerSaveAns MAC command) having a payload that identifies the locally stored PSM parameters and the operations can continue to 510 at which the LRR end device transitions to the PSM. In one embodiment, the payload for the response can be constructed to identify all the locally stored PSM parameters or, in another embodiment, the payload can be constructed to identify only the locally stored PSM parameters that differ from the received PSM parameters. If the LRR end device 102*a* determines that there are no locally stored PSM parameter(s) that differ from the received PSM parameters the operations can continue to 510.

At 512, the operations can include LRR end device 102*a* generating and sending a PSM response to the network server 106 acknowledging transition to the PSM. In one embodiment, if the LRR end device has determined that no locally stored PSM parameter(s) differ from the received PSM parameters, the end device can generate and send the acknowledgment using a PowerSaveAns MAC command that does not include a payload. In another embodiment, if the LRR end device has determined that there are locally stored PSM parameter(s) that differ from the received PSM parameters, the end device can generate and send the acknowledgment using a PowerSaveAns MAC command having the payload as generated at 508. The disabling the opening of at least one downlink receive window as may be identified in the PowerSaveReq MAC command for the PSM can be performed by the LRR end device 102*a* for the PSM following the uplink transmission of the PSM response to the network server 106.

Following the operations at 512, the operations can continue to respective operations 514 and 516, which can be performed as described respectively at 408 and 410 for the embodiment of FIG. 4. Other respective operations 518, 520 and optionally 522, which can be performed as described respectively at 412, 414 and optionally 416 for the embodiment of FIG. 4. Operations at 524 can be performed as described at 418 for the embodiment of FIG. 4. Operations at 526 can be performed similarly as described at 420 for the embodiment of FIG. 4 except that if a PSM request is received from the network server, the operations for the embodiment of FIG. 5 can return to 504 at which another comparison can be performed between locally stored PSM parameter(s) and any received PSM parameters and subsequent operations can be performed as described above.

Accordingly, LRR end devices can be configured to operate in a PSM using PSM parameters received from the network server 106 or using locally stored PSM parameters as discussed for various embodiments described herein.

Figure 6:
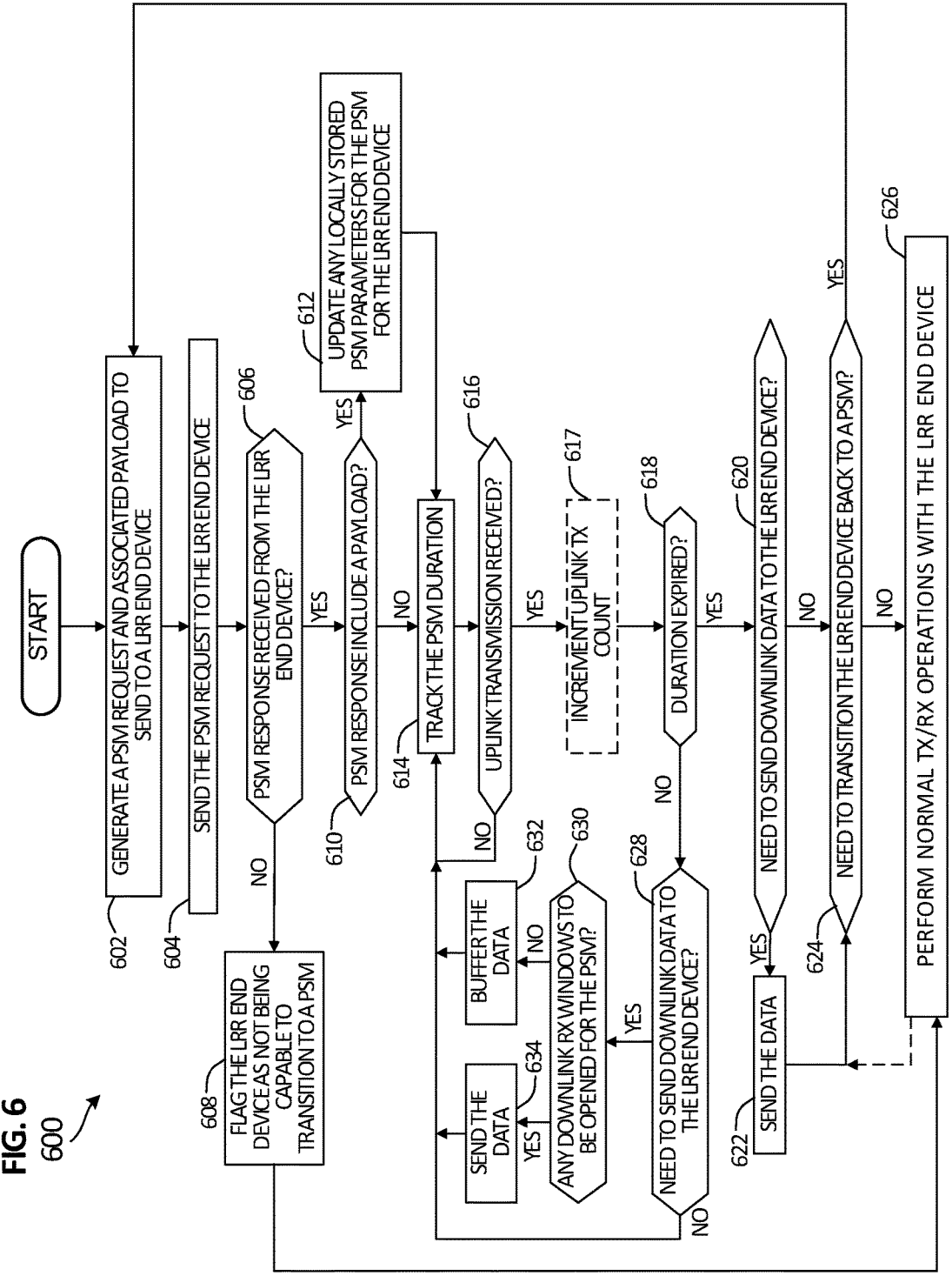
FIG. 6 is a simplified flow diagram illustrating other example details that can be associated with other example operations that can facilitate power management in a long range radio network environment in accordance with one potential embodiment of the communication system.

Referring to FIG. 6, FIG. 6 is a simplified flow diagram illustrating other example details that can be associated with example operations 600 that can facilitate power management in a long range radio network environment in accordance with one potential embodiment of communication system 100. In particular, the embodiment of FIG. 6 can be associated with operations performed by network server 106 to transition a LRR end device say, for example, LRR end device 102*a*, to a PSM in accordance with one example embodiment of communication system 100. For the embodiment of FIG. 6 it is assumed that the operations begin during an Activation procedure for LRR end device 102*a*.

At 602, the operations can include network server 106 generating a PSM request and associated payload to send to the LRR end device 102*a*. In at least one embodiment, generating can include the network server configuring a PowerSavReq MAC command and associated payload (e.g., PSM parameters) according to a particular format, as discussed herein (e.g., as illustrated in FIGS. 2A-2D). At 604, the operations can include the network server sending the PSM request (e.g., the PowerSaveReq MAC command and payload) to the LRR end device 102*a*.

At 606, the network server 106 can determine whether a PSM response (e.g., a PowerSavAns MAC command) has been received from the LRR end device 102*a*. If no PSM response is received from the end device, the operations can continue to 608 at which the network server 106 flags the LRR end device 102*a* as not being capable to transition to a PSM and the operations can continue to 626 at which the network server performs normal transmit and/or receive operations with the LRR end device 102*a*.

However, if the network server 106 determines at 606 that a PSM response is received from LRR end device 102*a*, the operations can continue to 610 at which the network server determines whether the PSM response includes a payload. If the PSM response does include a payload, then the network server can determine that the long range radio end device has one or more locally configured PSM parameter(s) that differ from the PSM parameters for the payload accompanying the PSM request sent from the network server 106 and the network server can update any locally stored PSM parameters for the PSM for the LRR send device 102*a* at 612 as identified in the payload and the operations can continue to 614. If the PSM response does not include a payload the operations can continue directly to 614.

At 614 and 616, the operations can include network server 106 tracking the PSM duration, which can include tracking a time-type duration or a transmission-type duration, depending on the PSM parameters for the PSM for LRR end device 102*a*. At 616, the network server can determine whether an uplink transmission has been received from the end device. If no uplink transmission has been received, the operations can return to the tracking at 614.

If an uplink transmission has been received, the operations can continue to 618 and, in at least one embodiment, the operations can include 617 at which the network server increments an uplink transmission count for the end device (e.g., if a transmission-type duration is set for the PSM). At 618, the operations can include the network server 106 determining whether the PSM duration has expired for the PSM associated with LRR end device 102*a* (e.g., performing a time-based comparison or a transmission count-based comparison).

If the network server 106 determines at 618 that the PSM duration has expired, the operations can continue to 620 at which the network server determines whether it needs to send the LRR end device 102*a* any downlink data. If the network server 106 determines that it needs to send downlink data to the LRR end device 102*a*, the operations can continue 622 at which the network server can send the downlink data to the LRR end device 102*a* at a transmission opportunity corresponding to one or more receive windows opened up by the end device (e.g., since the device is assumed to no longer be in the PSM) and the operations can continue to 624. If the network server 106 determines at 620 that it does not need to send data to LRR end device 102*a*, the operations can continue directly to 624.

At 624, the network server can determine whether it needs to transition the LRR end device 102*a* back to a PSM. If the network server determines at 624 that it does not need to transition the LRR end device back to a PSM, the operations can continue to 626 at which the network server 106 can perform normal transmit and/or receive operations with the LRR end device 102*a*. In at least one embodiment during the operations at 626, the network server 106 can continue to determine whether there is a need to transition the LRR end device 102*a* back to a PSM (e.g., based on one or more needs as discussed for various embodiments described herein that can be determined by the network server 106 and/or an application server associated with an application running on the end device).

If the network server determines at 624 that it does need to transition the LRR end device back to a PSM, the operations can return to 602 at which the network server can generate a PSM request and associated payload to send to the LRR end device and the operations can continue as discussed above.

Recalling the operations at 618, if the network server 106 determines that the PSM duration for LRR end device 102*a* has not expired, the operations can continue to 628 at which the network server can determine whether it needs to send any downlink data to the LRR end device. If the network server 106 determines at 628 that it does not need to send any downlink data to the LRR end device 102*a*, the operations can return to 614 and continue as described above.

However, if the network server 106 determines at 628 that it does need to send downlink data to the LRR end device 102*a*, then the operations can continue to 630 at which the network server can determine whether any downlink receive windows are to be opened for the PSM for the end device (e.g., if only one RX window has been disabled from being opened in the PSM). If the network server 106 determines at 630 that there are no downlink receive windows that are to be opened for the PSM for the LRR end device 102*a*, then the operations can continue to 632 at which the network server 106 buffers the data and the operations can return to 614 and continue as described above. If the network server 106 determines at 630 that there is at least one downlink receive window that is to be opened for the PSM for the LRR end device 102*a*, then the operations can continue to 634 at which the network server sends the data to the LRR end device 102*a* at a transmission opportunity corresponding to the downlink receive window that is to be opened by the end device in the PSM and the operations can return to 614 and continue as described above.

Accordingly, a network server (e.g., network server 106) can operate to perform communications with any number of LRR end device(s) (e.g., any of LRR end devices 102*a*-102*d*) to transition LRR end device(s) into PSM(s); update any locally stored PSM parameter(s) for the LRR end device(s), if needed; track the duration of their PSM(s); and/or buffer any downlink data, if needed, for the LRR end device(s) as discussed for various embodiments as described herein.

Figure 7A:
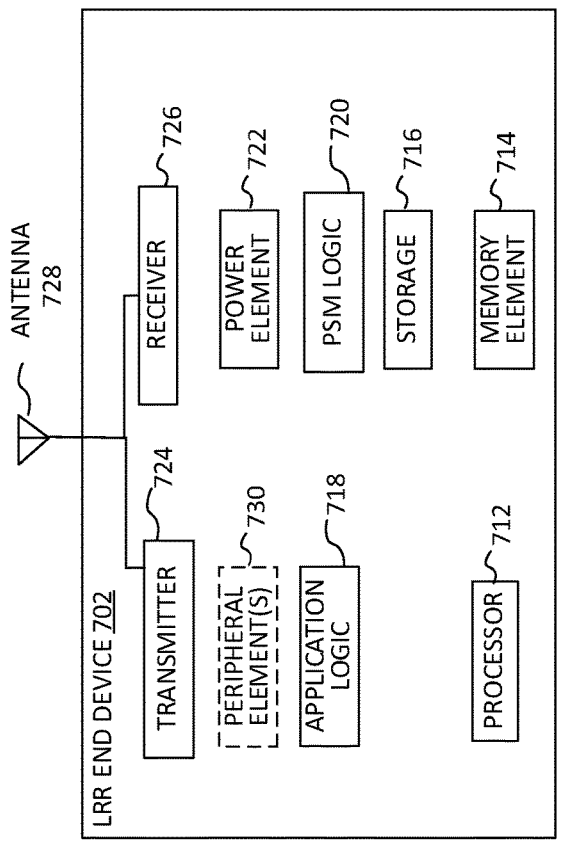

Referring to FIG. 7A, FIG. 7A is a is a simplified block diagram illustrating example details that can be associated with an LRR end device in accordance with one potential embodiment. FIG. 7A includes an LRR end device 702, which can include at least one processor 712, at least one memory element 714, at least one storage 716, application logic 718, PSM logic 720, at least one power element 722, at least one transmitter 724, at least one receiver 726 and at least one antenna 728. In various embodiments, LRR end device 702 can also be configured with one or more peripheral element(s) 730 including, but not limited to, sensor(s), detector(s), actuator(s), motor(s), etc. that can assist the LRR end device in collecting data, generating data and/or interacting with one or more external devices, which may be in communication with the LRR end device. In various embodiments, LRR end device 702 can be any LRR end device (e.g., any of LRR end devices 102*a*-102*bd*) that may be present in communication system 100.

In at least one embodiment, at least one processor 712 is at least one hardware processor configured to execute various tasks, operations and/or functions of the LRR end device as described herein. At least one memory element 714 and/or storage 716 can be configured to store data, information, software and/or instructions associated with the LRR end device as described herein. For example, in various embodiments, at least one memory element 714 and/or storage 716 can be configured to store one or more of: locally configured PSM parameters, PSM parameters received from a network server (e.g., network server 106); configuration information (e.g., messaging protocol and/or other configuration information for a LoRaWAN™/LoRa™ deployment or other LPWAN deployment, peripheral element configuration information, etc.); collected and/or generated data; logic; any other data, information software and/or instructions as discussed for various embodiments described herein (e.g., application logic 718 and/or PSM logic 720 can, in some embodiments, be stored in at least one memory element 714 and/or storage 716); combinations thereof or the like.

In various embodiments, power element 722 can include at least one battery, at least one capacitor, combinations thereof or any other element capable of storing power for use by LRR end device 702. In at least one embodiment, at least one transmitter 724, at least one receiver 726 and at least one antenna 728 can be configured to enable OTA RF communications between the LRR end device 702 and one or more gateways (e.g., gateway 104).

In at least one embodiment, application logic 718 can include instructions that, when executed (e.g., by at least one processor 712), cause the LRR end device 702 to perform one or more operations associated with one or more applications installed on the LRR end device which can include, but not be limited to: exchanging data and/or information with one or more application server(s) (e.g., any of application server(s) 108*a*-108*c*); data collection; data generation; performing uplink transmissions as needed; combinations thereof or the like.

In at least one embodiment, PSM logic 720 can include instructions that, when executed (e.g., by at least one processor 712), cause the LRR end device 702 to perform one or more operations as discussed herein including, but not limited to: receiving and processing PSM parameters via a PowerSaveReq MAC command received from a network server; performing comparisons between locally configured PSM parameters and any received PSM parameters; generating a PowerSaveAns MAC command, which may or may not include PSM parameters, to send to the network server; tracking a PSM duration set for the LRR end device for a PSM; disabling the opening up of at least one downlink receive window(s) following each of one or more uplink transmission(s) for the PSM duration while in the PSM; entering a sleep state following uplink transmissions and/or opening up an downlink receive windows while in a PSM (e.g., depending on PSM parameters for the PSM); combinations thereof or any other operations discussed for various embodiments described herein.

Figure 7B:
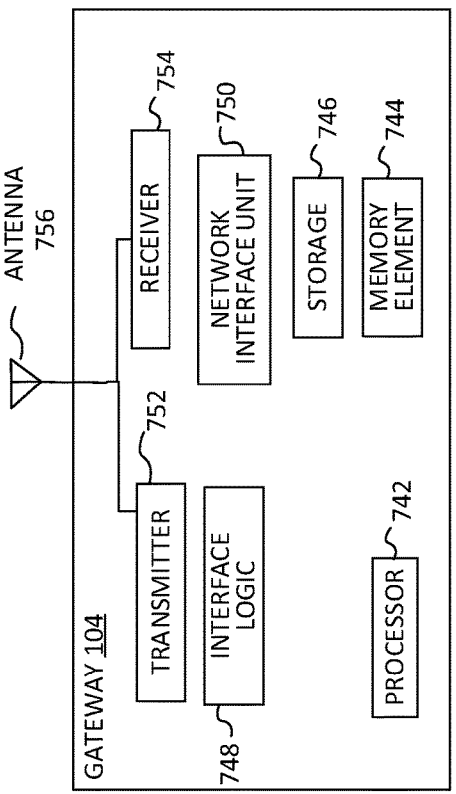

Referring to FIG. 7B, FIG. 7B is a simplified block diagram illustrating example details that can be associated with an example gateway in accordance with one potential embodiment. FIG. 7B includes gateway 104, which can include at least one processor 742, at least one memory element 744, at least one storage 746, interface logic 748, a network interface unit 750, at least one transmitter 752, at least one receiver 754 and at least one antenna 756.

In at least one embodiment, at least one processor 742 is at least one hardware processor configured to execute various tasks, operations and/or functions of gateway 104 as described herein. At least one memory element 744 and/or storage 746 can be configured to store data, information, software and/or instructions associated with the gateway 104. For example, in various embodiments, at least one memory element 744 and/or storage 746 can be configured to store one or more of: network configuration information (e.g., messaging protocol and/or other configuration information for a LoRaWAN™/LoRa™ deployment or other LPWAN deployment, etc.); network interface information (e.g., IP address information, tunnel information, port information, socket information, etc.); LRR end device information (e.g., DevAddr, IP address, RF configuration information, policy information, contract information, etc.); logic; any other data, information software and/or instructions as discussed for various embodiments described herein (e.g., interface logic 748 can, in some embodiments, be stored in at least one memory element 744 and/or storage 746); combinations thereof or the like.

In various embodiments, network interface unit 750 enables communication between gateway 104, network server 106, one or more application server(s) 108a-108c and/or any other elements that may be configured for communication system 100. In some embodiments, network interface unit 750 can be configured with one or more Ethernet driver(s), Fibre Channel driver(s), controller(s), etc. and/or other similar network interface driver(s) and/or controller(s) to enable communications for gateway 104 within communication system 100. In at least one embodiment, at least one transmitter 752, at least one receiver 754 and at least one antenna 756 can be configured to enable OTA RF communications between gateway 104 and one or more LRR end devices.

In at least one embodiment, interface logic 748 can include instructions that, when executed (e.g., by at least one processor 742), cause gateway 104 to perform one or more operations to enable gateway 104 to facilitate the exchange of messaging among one or more devices, servers, elements, etc. that may be deployed for communication system 100 via network interface 750 and/or at least one transmitter 752, at least one receiver 754 and at least one antenna 756.

Referring to FIG. 7C, FIG. 7C is a simplified block diagram illustrating example details that can be associated with an example network server in accordance with one potential embodiment. FIG. 7C includes network server 106, which can include at least one processor 762, at least one memory element 764, at least one storage 766, interface logic 768, PSM management logic 770 and a network interface unit 772.

In at least one embodiment, at least one processor 762 is at least one hardware processor configured to execute various tasks, operations and/or functions of network server 106 as described herein. At least one memory element 764 and/or storage 766 can be configured to store data, information, software and/or instructions associated with the network server 106. For example, in various embodiments, at least one memory element 764 and/or storage 766 can be configured to store one or more of: network configuration information (e.g., messaging protocol and/or other configuration information for a LoRaWAN™/LoRa™ deployment or other LPWAN deployment, etc.); PSM parameters for one or more locally stored PSM configurations (e.g., based on deployment, application, contract, etc.) for one or more LRR end device(s); PSM parameters received from one or more LRR end device(s); uplink data, commands, etc. received from one or more LRR end device(s); buffered data to be sent to one or more LRR end device(s); network interface information (e.g., IP address information, tunnel information, port information, socket information, etc.) for one or more network elements, devices, servers, etc.; LRR end device information (e.g., DevAddr, IP address, RF configuration information, policy information, contract information, etc.); logic; any other data, information software and/or instructions as discussed for various embodiments described herein (e.g., interface logic 768 and/or PSM management logic 770 can, in some embodiments, be stored in at least one memory element 764 and/or storage 766); combinations thereof or the like.

In at least one embodiment, PSM management logic 770 can include instructions that, when executed (e.g., by at least one processor 762), cause the network server 106 to perform one or more operations as discussed herein including, but not limited to: determining a need to transition an LRR end device to a PSM; generating a PowerSaveReq MAC command including one or more PSM parameter(s) for an LRR end device; sending a PowerSaveReq MAC command including PSM parameter(s) to an LRR end device; receiving and processing a PowerSaveAns MAC command, which may or may not include PSM parameters, received from an LRR end device; tracking a PSM duration set for an LRR end device for a PSM; disabling the sending of downlink data during at least one downlink receive window(s) following each of one or more uplink transmission(s) received from an LRR end device for a PSM duration that the LRR end device is in a PSM; buffering any downlink data that needs to be sent to an LRR end device during a PSM in which the end device will not open at least one downlink receive window; combinations thereof or any other operations discussed for various embodiments described herein.

In various embodiments, network interface unit 772 enables communication between network server 106, gateway 104, one or more application server(s) 108a-108c and/or any other elements that may be configured for communication system 100. In some embodiments, network interface unit 772 can be configured with one or more Ethernet driver(s), Fibre Channel driver(s), controller(s), etc. and/or other similar network interface driver(s) and/or controller(s) to enable communications for network server 106 within communication system 100.

In at least one embodiment, interface logic 768 can include instructions that, when executed (e.g., by at least one processor 762), cause network server 106 to perform one or more operations to enable network server 106 to facilitate the exchange of messaging among one or more devices, servers, elements, etc. that may be deployed for communication system 100 via network interface unit 772.

Referring to FIG. 7D, FIG. 7D is a is a simplified block diagram illustrating example details that can be associated with an application server in accordance with one potential embodiment. FIG. 7D includes an application server 708, which can include at least one processor 782, at least one memory element 784, at least one storage 786, interface logic 788, application management logic 790 and a network interface unit 792. In various embodiments, application server 708 can be any application server (e.g., any of application servers 108a-108c) that may be present in communication system 100.

In at least one embodiment, at least one processor 782 is at least one hardware processor configured to execute various tasks, operations and/or functions of application server 708 as described herein. At least one memory element 784 and/or storage 786 can be configured to store data, information, software and/or instructions associated with the application server 708. For example, in various embodiments, at least one memory element 784 and/or storage 786 can be configured to store one or more of: network configuration information (e.g., messaging protocol and/or other configuration information for a LoRaWAN™/LoRa™ deployment or other LPWAN deployment, etc.); PSM parameters for one or more locally stored PSM configuration(s) (e.g., based on deployment, application, contract, etc.) for one or more LRR end device(s); buffered data to be sent to one or more LRR end device(s); network interface information (e.g., IP address information, tunnel information, port information, socket information, etc.) for one or more network elements, devices, servers, etc.; LRR end device information (e.g., DevAddr, IP address, policy information, contract information, etc.); logic; any other data, information software and/or instructions as discussed for various embodiments described herein (e.g., interface logic 788 and/or application management logic 790 can, in some embodiments, be stored in at least one memory element 784 and/or storage 786); combinations thereof or the like.

In at least one embodiment, application management logic 790 can include instructions that, when executed (e.g., by at least one processor 782), cause the application server 108 to perform one or more operations associated with one or more applications installed on one or more LRR end device(s) including, but not limited to: exchanging data and/or information with one or more LRR end device(s); configuring applications installed on one more LRR end device(s); combinations thereof or the like.

In at least one embodiment, interface logic 788 can include instructions that, when executed (e.g., by at least one processor 782), cause application server 708 to perform one or more operations to enable application server 708 to facilitate the exchange of messaging among one or more devices, servers, elements, etc. that may be deployed for communication system 100 via network interface unit 792.

In various embodiments, network interface unit 792 enables communication between application server 708 and network server 106 and/or any other elements that may be configured for communication system 100. In some embodiments, network interface unit 792 can be configured with one or more Ethernet driver(s), Fibre Channel driver(s), controller(s), etc. or other similar network interface driver(s) and/or controller(s) to enable communications for application server 708 within communication system 100.

In regards to the internal structure associated with communication system 100 described herein, appropriate software, hardware and/or algorithms are being provisioned for communication system 100 in order to facilitate operations as described for various embodiments discussed herein to facilitate power management in a long range radio network environment.

In one example implementation, LRR end devices 102a-102d (inclusive of LRR end device 702), gateway 104, network server 106 and/or application servers 108a-108c (inclusive of application server 708) discussed for various embodiments described herein can encompass network appliances, routers, servers, switches, gateways, bridges, loadbalancers, firewalls, processors, modules, radio receivers/transmitters or any other suitable device, component, element, or object operable to exchange information that facilitates or otherwise helps to facilitate various operations as described for various embodiments discussed herein in a network environment (e.g., for networks such as those illustrated in FIG. 1A). In various embodiments, one or more of LRR end devices 102a-102d (inclusive of LRR end device 702), gateway 104, network server 106 and/or application servers 108a-108c (inclusive of application server 708) discussed herein can include software (or reciprocating software) that can coordinate in order to achieve operations associated with providing power management in a long range radio network environment as discussed herein and may include any suitable algorithms, hardware, software, components, modules, clients, interfaces, and/or objects that facilitate the operations thereof. This may be inclusive of appropriate algorithms, communication protocols, interfaces and/or standards, proprietary and/or non-proprietary that allow for the effective exchange of data or information.

In various embodiments, LRR end devices 102a-102d (inclusive of LRR end device 702), gateway 104 and/or network server 106 application servers 108a-108c (inclusive of application server 708) discussed herein may keep information in any suitable memory element [e.g., random access memory (RAM), read only memory (ROM), an erasable programmable read only memory (EPROM), application specific integrated circuit (ASIC), etc.], software, hardware, or in any other suitable component, device, element, and/or object where appropriate and based on particular needs. Any of the memory items discussed herein should be construed as being encompassed within the broad term 'memory element'. Information being tracked or sent to LRR end devices 102a-102d (inclusive of LRR end device 702), gateway 104, network server 106 and/or application servers 108a-108c (inclusive of application server 708) discussed herein could be provided in any database, register, control list, cache, storage and/or storage structure: all of which can be referenced at any suitable timeframe. Any such storage options may be included within the broad term 'memory element' as used herein. Similarly, any of the potential processing elements, controllers, managers, logic and/or machines described herein can be construed as being encompassed within the broad term 'processor'. In various embodiments, each of LRR end devices 102a-102d (inclusive of LRR end device 702), gateway 104, network server 106 and/or application servers 108a-108c (inclusive of application server 708) discussed herein can also include suitable interfaces for receiving, transmitting, and/or otherwise communicating data or information in a network environment.

Note that in certain example implementations, operations as outlined herein to facilitate power management of long range radio end devices may be implemented by logic encoded in one or more tangible media, which may be inclusive of non-transitory tangible media and/or non-transitory computer readable storage media (e.g., embedded logic provided in an ASIC, in digital signal processing (DSP) instructions, software [potentially inclusive of object code and source code] to be executed by a processor, or other similar machine, etc.). In some of these instances, a memory element and/or storage [as shown in FIGS. 7A-7D] can store data, software, code, instructions (e.g., processor instructions), logic, parameters, combinations thereof or the like used for operations described herein. This includes memory elements and/or storage being able to store data, software, code, instructions (e.g., processor instructions), logic, parameters, combinations thereof or the like that are executed to carry out operations described herein. A processor (e.g., a hardware processor) can execute any type of instructions associated with data to achieve the operations detailed herein. In one example, a processor [as shown in FIGS. 7A-7D] can transform an element or an article (e.g., data, information) from one state or thing to another state or thing. In another example, operations outlined herein may be implemented with logic, which can include fixed logic, hardware logic, programmable logic, digital logic, etc. (e.g., software/computer instructions executed by a processor) and/or one or more the elements identified herein could be some type of a programmable processor, programmable digital logic (e.g., a field programmable gate array (FPGA), a DSP processor, an EPROM, a controller, an electrically erasable PROM (EEPROM) or an ASIC that includes digital logic, software, code, electronic instructions, or any suitable combination thereof.

Each of LRR end devices 102a-102d (inclusive of LRR end device 702), gateway 104, network server 106 and/or application servers 108a-108c (inclusive of application server 708) discussed for various embodiments described herein can couple to one another through simple interfaces (as illustrated) or through any other suitable connection (wired or wireless), which provides a viable pathway for network communications. Additionally, any one or more of LRR end devices 102a-102d (inclusive of LRR end device 702), gateway 104, network server 106 and/or application servers 108a-108c (inclusive of application server 708) discussed herein may be combined or removed from a given deployment based on particular configuration needs.

Note that in this Specification, references to various features (e.g., elements, structures, nodes, modules, components, logic, steps, operations, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein this Specification, can be inclusive of an executable file comprising instructions that can be understood and processed on a computer, processor, combinations thereof or the like and may further include library modules loaded during execution, object files, system files, hardware logic, software logic, or any other executable modules.

It is also important to note that the operations and steps described with reference to the preceding FIGURES illustrate only some of the possible scenarios that may be executed by, or within, the communication system 100. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Note that with the examples provided above, as well as numerous other examples provided herein, interaction may be described in terms of one, two, three, or four network elements. However, this has been done for purposes of clarity and example only. In certain cases, it may be easier to describe one or more of the functionalities by only referencing a limited number of network elements. It should be appreciated that communication system 100 (and its teachings) are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

As used herein, unless expressly stated to the contrary, use of the phrase 'at least one of', 'one or more of' and 'and/or' are open ended expressions that are both conjunctive and disjunctive in operation for any combination of named elements, conditions, or activities. For example, each of the expressions 'at least one of X, Y and Z', 'at least one of X, Y or Z', 'one or more of X, Y and Z', 'one or more of X, Y or Z' and 'A, B and/or C' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two X elements that are not necessarily limited by any order, rank, importance, temporal sequence, or hierarchy of the two elements. As referred to herein, 'at least one of' and 'one or more of' can be represented using the '(s)' nomenclature (e.g., one or more element(s)).

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, interfaces and protocols, communication system 100 may be applicable to other exchanges or routing protocols, interfaces and/or communications standards, proprietary and/or non-proprietary. Moreover, although communication system 100 has been illustrated with reference to particular elements and operations that facilitate the communication process, these elements, and operations may be replaced by any suitable architecture or process that achieves the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
    receiving a power saving mode (PSM) request by a long range radio, wherein the PSM request comprises an identification of at least one first receive window to disable and at least one second receive window to enable for the long range radio for a plurality of uplink transmissions and an identification of a duration for which the at least one first receive window is to be disabled and the at least one second receive window is to be enabled for the plurality of uplink transmissions;
    transmitting the plurality of uplink transmissions by the long range radio, wherein the at least one first receive window is disabled and the at least one second receive window is enabled following each uplink transmission of the plurality of uplink transmissions by the long range radio for the duration identified in the PSM request; and
    receiving data when the at least one second receive window is enabled.

2. The method of claim 1, wherein the PSM request is received from a network server in communication with the long range radio.

3. The method of claim 2, wherein the duration identifies one of:
    a period of time for which the long range radio is to disable the at least one first receive window following each uplink transmission of the plurality of uplink transmissions; and
    a number of uplink transmissions for which the long range radio is to disable the at least one first receive window following each uplink transmission of the plurality of uplink transmissions.

4. The method of claim 3, further comprising:
    determining by the long range radio whether to comply with the PSM request based, at least in part, on whether one or more PSM parameters stored by the long range radio identifies at least one of:
        another at least one receive window to disable that is different than the at least one first receive window identified in the PSM request; and
        another duration that is different than the duration identified in the PSM request.

5. The method of claim 4, further comprising:
    sending a PSM response to the network server following the determining, wherein the PSM response does not include a payload based on the long range radio determining that it will comply with the PSM request and wherein the PSM response does include a payload based on the long range radio determining that it will not comply with the PSM request.

6. The method of claim 5, wherein the payload includes at least one of:
    an identification of the another at least one receive window that the long range radio will disable that is different than the at least one first receive window identified in the PSM request; and
    an identification of the another duration that is different than the duration identified in the PSM request.

7. The method of claim 1, further comprising:
    transitioning the long range radio to a sleep state following each uplink transmission of the plurality of uplink transmissions for which at least one receive window is disabled.

8. The method of claim 1, wherein the long range radio is configured as a Class A LoRa™ end device configured to operate within a LoRaWAN™ deployment.

9. The method of claim 1, wherein the PSM request is a Medium Access Control (MAC) command configured to be received by a Class A LoRa™ end device.

10. One or more non-transitory tangible media encoding logic that includes instructions for execution that when executed by a processor, is operable to perform operations comprising:
    receiving a power saving mode (PSM) request by a long range radio, wherein the PSM request comprises an identification of at least one first receive window to disable and at least one second receive window to enable for the long range radio for a plurality of uplink transmissions and an identification of a duration for which the at least one first receive window is to be disabled and the at least one second receive window is to be enabled for the plurality of uplink transmissions;
    transmitting the plurality of uplink transmissions by the long range radio, wherein the at least one first receive window is disabled and the at least one second receive window is enabled following each uplink transmission of the plurality of uplink transmissions by the long range radio for the duration identified in the PSM request; and
    receiving data when the at least one second receive window is enabled.

11. The media of claim 10, wherein the PSM request is received from a network server in communication with the long range radio.

12. The media of claim 11, wherein the duration identifies one of:
    a period of time for which the long range radio is to disable the at least one first receive window following each uplink transmission of the plurality of uplink transmissions; and
    a number of uplink transmissions for which the long range radio is to disable the at least one first receive window following each uplink transmission of the plurality of uplink transmissions.

13. The media of claim 12, the operations further comprising:
    determining by the long range radio whether to comply with the PSM request based, at least in part, on whether one or more PSM parameters stored by the long range radio identifies at least one of:
        another at least one receive window to disable that is different than the at least one first receive window identified in the PSM request; and
        another duration that is different than the duration identified in the PSM request.

14. The media of claim 13, the operations further comprising:
    sending a PSM response to the network server following the determining, wherein the PSM response does not include a payload based on the long range radio determining that it will comply with the PSM request and wherein the PSM response does include a payload based on the long range radio determining that it will not comply with the PSM request.

15. The media of claim 14, wherein the payload includes at least one of:
  an identification of the another at least one receive window that the long range radio will disable that is different than the at least one first receive window identified in the PSM request; and
  an identification of the another duration that is different than the duration identified in the PSM request.

16. The media of claim 10, the operations further comprising:
  transitioning the long range radio to a sleep state following each uplink transmission of the plurality of uplink transmissions for which at least one receive window is disabled.

17. A long range radio comprising:
  a memory element for storing data; and
  a processor to execute instructions associated with the data that, when executed, the long range radio is configured to:
    receive a power saving mode (PSM) request, wherein the PSM request comprises an identification of at least one first receive window to disable and at least one second receive window to enable for the long range radio for a plurality of uplink transmissions and an identification of a duration for which the at least one first receive window is to be disabled and the at least one second receive window is to be enabled for the plurality of uplink transmissions;
    transmit the plurality of uplink transmissions by the long range radio, wherein the at least one first receive window is disabled and the at least one second receive window is enabled following each uplink transmission of the plurality of uplink transmissions by the long range radio for the duration identified in the PSM request; and
    receive data when the at least one second receive window is enabled.

18. The long range radio of claim 17, wherein the duration identifies one of:
  a period of time for which the long range radio is to disable the at least one first receive window following each uplink transmission of the plurality of uplink transmissions; and
  a number of uplink transmissions for which the long range radio is to disable the at least one first receive window following each uplink transmission of the plurality of uplink transmissions.

19. The long range radio of claim 18, the processor to execute further instructions associated with the data that, when executed, the long range radio is further configured to:
  determine whether to comply with the PSM request based, at least in part, on whether one or more PSM parameters stored by the long range radio identifies at least one of:
    another at least one receive window to disable that is different than the at least one first receive window identified in the PSM request; and
    another duration that is different than the duration identified in the PSM request.

20. The long range radio of claim 19, the processor to execute further instructions associated with the data that, when executed, the long range radio is further configured to:
  send a PSM response to a network server, wherein the PSM response does not include a payload based on the long range radio determining that it will comply with the PSM request and wherein the PSM response does include a payload based on the long range radio determining that it will not comply with the PSM request.

* * * * *